US012623838B1

(12) United States Patent
Waesche

(10) Patent No.: US 12,623,838 B1
(45) Date of Patent: May 12, 2026

(54) LIQUID HAND TRUCK, LIQUID RECEPTACLE, COMBINATION LIQUID HAND TRUCK AND RECEPTACLE, SYSTEM AND/OR METHOD FOR HANDLING LIQUIDS

(71) Applicant: Luke Waesche, Hagerstown, MD (US)

(72) Inventor: Luke Waesche, Hagerstown, MD (US)

( * ) Notice: Subject to any disclaimer, the term of this patent is extended or adjusted under 35 U.S.C. 154(b) by 264 days.

(21) Appl. No.: 17/395,097

(22) Filed: Aug. 5, 2021

Related U.S. Application Data

(60) Provisional application No. 63/061,503, filed on Aug. 5, 2020.

(51) Int. Cl.
*B65F 1/00* (2006.01)
*B65F 1/14* (2006.01)

(52) U.S. Cl.
CPC .......... *B65F 1/0093* (2013.01); *B65F 1/1473* (2013.01); *B62B 2202/20* (2013.01)

(58) Field of Classification Search
CPC ... B65F 1/0093; B65F 1/1473; B62B 2202/20
See application file for complete search history.

(56) References Cited

U.S. PATENT DOCUMENTS

| | | | | | |
|---|---|---|---|---|---|
| 4,479,751 | A | * | 10/1984 | Wyman | B65F 3/046 |
| | | | | | 414/420 |
| 4,635,950 | A | * | 1/1987 | Le Sage | B62B 1/10 |
| | | | | | 220/592.2 |
| 4,778,191 | A | * | 10/1988 | Heisson | B62B 1/18 |
| | | | | | 220/908 |

OTHER PUBLICATIONS

Worcester Industrial Products, Economy Series Carrier, Advertisement.

* cited by examiner

*Primary Examiner* — Timothy L Maust
(74) *Attorney, Agent, or Firm* — THE GARCIA-ZAMOR LAW FIRM; Ruy Garcia-Zamor

(57) ABSTRACT
A combination liquid holding device and liquid receptacle, a liquid holding device, a liquid receptacle, a liquid management system, kit, and/or method which preferably greatly enhances the ease and reduces the work required to dispose of undesired liquid. A combination liquid holding device and liquid receptacle, the liquid hand truck, and the liquid dumpster may be entirely manually powered, manually powered and free of all motors and electrical components, may be operated by a powered device, may include a motor, or may be operated manually with a powered assist.

7 Claims, 38 Drawing Sheets

LIQUID HAND TRUCK, LIQUID RECEPTACLE, COMBINATION LIQUID HAND TRUCK AND RECEPTACLE, SYSTEM AND/OR METHOD FOR HANDLING LIQUIDS

CROSS REFERENCE TO RELATED APPLICATIONS

This application claims priority to and benefit of U.S. Provisional Patent No. 63/061,503, filed Aug. 5, 2020, which is hereby incorporated by reference in its entirety as if fully set forth herein.

BACKGROUND

The preferred embodiments of the present invention relate generally to hand trucks and waste receptacles. More specifically, the preferred embodiment of the present invention relates to liquid hand trucks and liquid waste receptacles. More specifically still, one preferred embodiment of the present invention relates to a combination liquid holding device and liquid receptacle. The present invention may also relate to a stand-alone liquid hand truck. The present invention may also relate to a stand-alone liquid receptacle.

Typically, the disposal of waste kitchen oil in commercial setting requires either the carrying of a small, heavy vessel holding the oil to a dumpster or hiring a professional waste removal service to come into the restaurant and collect the oil. However, carrying the oil can create messes and the infliction of self-injury because of the potential for spillage. In order to efficiently dispose of waste oil, restaurants and other commercial kitchens must employ the service of expensive waste oil disposal companies. However, much of the convenience is lost when the kitchens are forced to work around a third party's schedule for coming to pick up and transport away waste oil.

It may be advantageous to provide a combination liquid holding device and liquid receptacle, a liquid hand truck, and/or a liquid receptacle, which may preferably, but not necessarily, at least one of: is configured to transport and store waste oil for later disposal; take advantage of a hand truck design for easy transport of waste oil by a user; be manually operated without the use of motors or electrical components; which may incorporate a motor or lift assist such that the dumping of the liquid holding device into the liquid receptacle is easier and requires less work by the user; be easy to clean; have a thinner profile to fit underneath a nozzle or a drain hole in a fryer or other kitchen apparatus with waste oil; be visually attractive; be suitable for use in commercial kitchens, restaurants, food factories, and other settings where large amounts of waste oil from cooking is produced; be sturdy enough for commercial use; use filters to reduce the amount of foreign particulates entering the hand truck and/or the liquid receptacle; be efficient for manufacture; allow for the transportation of waste oil without spillage or overflow; be useful for use by people with limited strength or of advanced age; and/or be easy to use.

SUMMARY

Briefly speaking, one embodiment of the present invention is directed to a combination liquid holding device and liquid receptacle. The combination liquid holding device and liquid receptacle may comprise a liquid holding device. The liquid holding device may comprise a tank having an exterior surface and a base. A receptacle connector may be configured to engage the liquid holding device to allow pivoting therebetween. The tank may include wheels to facilitate moving the liquid holding device in a hand truck manner. The tank including a second connector configured to engage the first connector on the liquid receptacle to create a pivotal connection therebetween. The liquid may be waste oil.

In a separate aspect, the present invention is related to a hand truck configured to hold liquid. The hand truck may comprise a tank having an exterior surface configured to hold liquid and having a base. The tank may define a tank chamber configured to receive liquid therein. The tank may define a tank opening in fluid communication with the tank chamber. The hand truck may also comprise a plurality of wheels located on the tank proximate the base. The hand truck may further comprise at least one of a handle and a grip formed by a portion of the exterior surface such that a user can incline and roll the tank to facilitate transport thereof.

In a separate aspect, the present invention may be directed a hand truck and a dumpster. The hand truck may be configured to hold waste. The hand truck may detachably connect to dumpster to assist the user in dumping waste from the hand truck into the dumpster.

In a separate aspect, the present invention may be directed to a hand truck. The hand truck may have a hollow body. The hollow body may be configured to hold waste. The waste may comprise liquid. The liquid may comprise oil. The oil may comprise cooking oil. The cooking oil may come from a deep fryer or other cooking device. The hand truck may be configured to lay flatly underneath a drainage spout in the cooking device. The hand truck may then be righted for transportation.

In a separate aspect, one embodiment of the present invention is directed to a combination liquid holding device and liquid receptacle. The combination liquid holding device and liquid receptacle may comprise a liquid holding device. The liquid holding device may comprise a tank having an exterior surface and a base. The tank may define a tank chamber configured to hold liquid therein. The tank may further define a tank opening in fluid communication with the chamber. The liquid holding device may also comprise an attachment bar secured to the tank in a spaced apart fashion from the exterior surface. The attachment bar may define an axis of rotation. The combination liquid holding device and liquid receptacle may further comprise a liquid receptacle positioned on a supporting surface. The liquid receptacle may comprise a receptacle body defining a receptacle chamber configured to hold and store liquid. The receptacle body may define a receptacle opening. The liquid receptacle may further define a receptacle bracket configured to detachably connect to the attachment bar. The liquid holding device may be rotatable relative to the liquid receptacle about the axis of rotation when the receptacle bracket is connected to the attachment bar of the liquid holding device. When the liquid holding device is connected to the liquid receptacle via the engagement of the attachment bar with the receptacle bracket, the liquid holding device may be rotated such that liquid tends to be biased for movement from the tank chamber, through the tank opening, through the receptacle opening, and into the receptacle chamber.

In a separate aspect, the present invention is directed to a combination liquid holding device and liquid receptacle. The combination liquid holding device and liquid receptacle may comprise a liquid holding device. The liquid holding device may comprise a tank having an exterior surface and a base. The liquid holding device may further comprise a plurality of wheels attached to the tank. The plurality of wheels may be configured to facilitate transporting the tank. By allowing the plurality of wheels to roll on the supporting surface while moving the tank, the tank can be moved in a same manner as a hand truck.

In a separate aspect, the present invention is directed to a combination liquid holding device and liquid receptacle. The combination liquid holding device and liquid receptacle may comprise a liquid holding device. The liquid holding device may comprise a tank having an exterior surface and a base. The tank may define a tank chamber configured to hold liquid therein. The tank may further define a tank opening in fluid communication with the chamber. The liquid holding device may also comprise an attachment bar secured to the tank in a spaced apart fashion from the exterior surface. The attachment bar may define an axis of rotation. The attachment bar may be on a same side of the tank as the tank opening.

In a separate aspect, the present invention is directed to a combination liquid holding device and liquid receptacle. The combination liquid holding device and liquid receptacle may comprise a liquid holding device. The liquid holding device may comprise a tank having an exterior surface and a base. The tank may define a tank chamber configured to hold liquid therein. The tank may further define a tank opening in fluid communication with the chamber. A first filtering insert may be configured for placement in the tank opening. The first filtering insert may be configured to reduce an amount of particulates and other foreign objects from entering the tank chamber with the liquid.

In a separate aspect, the present invention is directed to a combination liquid holding device and liquid receptacle. The combination liquid holding device and liquid receptacle may comprise a liquid holding device. The liquid holding device may comprise a tank having an exterior surface and a base. The tank may define a tank chamber configured to hold liquid therein. The tank may further define a tank opening in fluid communication with the chamber. A splash guard may be configured to sit in the tank opening. The splash guard may prevent excess liquid from splashing out of the tank opening from the tank chamber when the liquid holding device is attached thereto and rotated.

In a separate aspect, the present invention is directed to a combination liquid holding device and liquid receptacle. The combination liquid holding device and liquid receptacle may further comprise a liquid receptacle positioned on a supporting surface. The liquid receptacle may comprise a receptacle body defining a receptacle chamber configured to hold and store liquid. The receptacle body may define a receptacle opening. A second filtering insert may be configured to cover the receptacle opening. The second filtering insert may reduce the amount of particulates and other foreign objects from entering the receptacle chamber with the liquid.

In a separate aspect, the present invention is directed to a combination liquid holding device and liquid receptacle. The combination liquid holding device and liquid receptacle may comprise a liquid holding device. The liquid holding device may comprise a tank having an exterior surface and a base. The tank may define a tank chamber configured to hold liquid therein. The liquid holding device may be positioned in a first, vertical position. The base may be located on the supporting surface. The same side of the tank may be angled relative to the supporting surface.

In a separate aspect, the present invention is directed to a combination liquid holding device and liquid receptacle. The liquid holding device may be positioned in a first, vertical position. The base may be located on the supporting surface. The same side of the tank may be angled relative to the supporting surface. When the liquid holding device is in the first, vertical position, the attachment bar and the receptacle bracket may be generally equally distanced from the supporting surface, as measured perpendicular to the supporting surface. The tank opening may be positioned farther from the supporting surface than the receptacle opening, as measured perpendicular to the supporting surface.

In a separate aspect, the present invention is directed to a combination liquid holding device and liquid receptacle. The liquid holding device may be in a second, horizontal position when the liquid holding device is engaged with the liquid receptacle, and the liquid holding device may have been rotated about the axis of rotation. The same side of the tank may be substantially parallel to the supporting surface. When the liquid holding device is in the second, horizontal position and engaged with the liquid receptacle, the tank opening may be above and closely aligned with the receptacle opening to facilitate pouring liquid from the liquid holding device into the liquid receptacle.

In a separate embodiment, the present invention is directed to a combination liquid holding device and liquid receptacle. The liquid holding device may be in a second, horizontal position when the liquid holding device is engaged with the liquid receptacle and the liquid holding device has been rotated about the axis of rotation. A same side of the tank may be substantially parallel to the supporting surface. The rotation of the liquid holding device from the vertical position to the horizontal position may be achieved via a lift assistance device.

In a separate aspect, the present invention is directed to a combination liquid holding device and liquid receptacle. The combination liquid holding device and liquid receptacle may comprise a liquid holding device. The liquid holding device may comprise a tank having an exterior surface and a base. The liquid holding device may further include a sidewall extending outwardly from the exterior surface of the tank and positioned along the perimeter of the tank opening to form a collar. The receptacle opening may be configured such that when the liquid holding device is in the second, horizontal position and engaged with the liquid receptacle, the collar may be located within the receptacle opening.

In a separate aspect, the present invention is directed to a combination liquid holding device and liquid receptacle. The combination liquid holding device and liquid receptacle may comprise a liquid holding device. The liquid holding device may comprise a tank having an exterior surface and a base. The liquid holding device may further include a sidewall extending outwardly from the exterior surface of the tank and positioned along the perimeter of the tank opening to form a collar. The receptacle opening may be configured such that when the liquid holding device is in the second, horizontal position and engaged with the liquid receptacle, the collar may be located within the receptacle opening. A lip of the liquid receptacle which may define part of the receptacle opening may be positioned between the attachment bar and the collar. A plurality of wheels may be attached to the tank. The plurality of wheels may be configured to facilitate transporting the tank by allowing the plurality of wheels to roll on the supporting surface while moving the tank such that the tank can be moved in a same manner as a hand truck, wherein the tank includes at least one handle.

In a separate aspect, the present invention is directed to a combination liquid holding device and liquid receptacle. The combination liquid holding device and liquid receptacle may comprise a liquid holding device. The liquid holding device may comprise a tank having an exterior surface and a base. The receptacle bracket may have a free end which incorporates a ramp section and may have a slot located between the ramp section and the liquid receptacle. The tank and the plurality of wheels may be configured such that when the liquid holding device is moved into the first vertical position after being moved as the hand truck with the edge of the base adjacent to the hand truck, the attachment bar may ride along the ramp portion to facilitate driving the attachment bar into position in the slot. The liquid may be waste oil.

In a separate aspect, the present invention is related to a hand truck configured to hold liquid. The hand truck may comprise an attachment bar secured to the tank in a spaced apart fashion from the exterior surface. The attachment bar may define an axis of rotation. The attachment bar may be configured such that when connected to a receptacle bracket, the hand truck may be rotated such that liquid tends to be biased for movement from the tank chamber and out through the tank opening. The liquid holding device may further include a sidewall extending outwardly from the exterior surface of the tank and positioned along the perimeter of the tank opening to form a collar. A first filtering insert may be configured for placement in the tank opening. The first filtering insert may be configured to reduce an amount of particulates and other foreign objects from entering the tank chamber with the liquid. The tank may be elongated with a first axial end and a second axial end. The first axial end may form the base configured to allow the hand truck to be placed in a stationary, upright position with the first axial end located on a supporting surface. The handle of the hand truck may be configured such that the tank can be supported generally parallel to the supporting surface with the wheels and the handle each spacing the tank from the supporting surface by a generally equal distance.

In a separate aspect, the present invention is related to a combination liquid holding device and liquid receptacle. The combination may comprise a liquid holding device. The liquid holding device may comprise a tank having an exterior surface and a base. The tank may define a tank chamber configured to hold liquid therein. The tank may also define a tank opening in fluid communication with the chamber. The combination may also comprise a liquid receptacle positioned on a supporting surface. The liquid receptacle may comprise a receptacle body defining a receptacle chamber configured to hold and store liquid. The combination may further comprise a tank lift device capable of moving between a first, non-pour position and a second, pour position. The liquid holding device may be positionable on and/or engageable with the tank lift device. The tank lift device may comprise a lift drive configured to assist in moving the tank lift device and a liquid holding device positioned thereon into the second, pour position. The receptacle body may define a receptacle opening. When the liquid holding device is positioned on and/or engaged with the tank lift device and the tank lift device is in the second, pour position, the liquid holding device may be positioned such that liquid tends to be biased for movement from the tank chamber, through the tank opening, through the receptacle opening, and into the receptacle chamber.

In a separate aspect, the present invention is related to a combination liquid holding device and liquid receptacle. The combination may further comprise a tank lift device capable of moving between a first, non-pour position and a second, pour position. The tank lift device may comprise a backrest plate having a first backrest plate axial end pivotally connected to the liquid receptacle. The liquid holding device may be positionable on the tank lift device such that the tank is positioned against the backrest plate. A tank lift bracket may be positioned on the liquid receptacle. The lift drive comprising a piston having a first piston end secured on the tank lift bracket and having a second piston end positioned on the backrest plate such that when the tank lift device is in the first, non-pour position the piston biases the tank lift device against rotation and such that when the tank lift device is rotated past a predetermined point the piston provides a tank lift assist to facilitate moving the tank lift device into the second, pour position.

In a separate aspect, the present invention is related to a combination liquid holding device and liquid receptacle. The combination may further comprise a tank lift device capable of moving between a first, non-pour position and a second, pour position. The tank lift device may comprise a backrest plate having a first backrest plate axial end pivotally connected to the liquid receptacle. The backrest plate may have a second backrest plate axial end with a first coupling mechanism thereon configured to engage a second coupling mechanism on the liquid holding device.

In a separate aspect, the present invention is related to a combination liquid holding device and liquid receptacle. The combination may further comprise a tank lift device capable of moving between a first, non-pour position and a second, pour position. The tank lift device may comprise a backrest plate having a first backrest plate axial end pivotally connected to the liquid receptacle. The backrest plate may have a second backrest plate axial end with a first coupling mechanism thereon configured to engage a second coupling mechanism on the liquid holding device. The liquid holding device may further comprise a plurality of wheels configured to facilitate transporting the tank by allowing the plurality of wheels to roll on the supporting surface while moving the tank. In this way, the tank can be moved in an inclined, ready-to-roll position in a same manner as a hand truck. The first coupling mechanism may be configured to engage the second coupling mechanism while moving the liquid holding device from the inclined, ready-to-roll position into an upright position.

In a separate aspect, the present invention is directed to a liquid receptacle positioned on a supporting surface. The liquid receptacle may comprise a receptacle body defining a receptacle chamber configured to hold and store liquid. The receptacle body may further define a receptacle opening. The liquid receptacle may also comprise a tank lift device positioned on the receptacle body and capable of moving between a first, non-pour position and a second, pour position. The tank lift device may be adapted to have a liquid holding device positioned thereon. The tank lift device may comprise a backrest plate having a first backrest plate axial end pivotally connected to the liquid receptacle. The liquid holding device may be positionable on the tank lift device such that the tank may be positioned against the backrest plate. A tank lift bracket may be positioned on the liquid receptacle. The liquid receptacle may additionally comprise a piston having a first piston end secured on the tank lift bracket and a second piston end positioned on the backrest plate. When the tank lift device is in the first, non-pour position, the piston may bias the tank lift device against rotation. When the tank lift device is rotated past a predetermined point, the piston may provide a tank lift assist to facilitate moving the tank lift device into the second, pour position. When the tank lift device is in the second, pour position, the tank lift device may be adapted such that the liquid holding device is positioned so that liquid may tend to be biased for movement from the tank chamber, through the tank opening, through the receptacle opening, and into the receptacle chamber.

In a separate embodiment, the present invention may be directed to a liquid receptacle. The receptacle may comprise a dumpster. The dumpster may be configured to hold and store waste. The waste may comprise oil. The dumpster may comprise a lift assist. The lift assist may be used to make the dumping of oil and other waste into the dumpster easier for a user.

In a separate embodiment, the present invention is directed to combination liquid holding hand truck and liquid holding dumpster. The combination may comprise a lift assist for assisting the user in dumping the contents of the liquid holding hand truck into the liquid holding dumpster. The combination may additionally comprise a motor, hydraulic system, or the like which automatically drives the lift assist in response to the operation of a controller by a user. The motor may be attached to liquid holding dumpster directly, located therein, or may be in fluid or electric communication therewith. When the control is activated, the lift arm may be rotated about the axis of rotation. The combination may then be configured to rotate the arm in the opposite direction to bring the hand truck back down to the supporting surface. The controller may be remotely located such as a desk mounted switch, or a software module on an electronic device/computer, or via a mobile application on a phone or tablet.

In a separate aspect, the present invention is directed to a combination liquid holding device which is a bucket and liquid receptacle. The combination liquid holding device/bucket and liquid receptacle may comprise a liquid holding device. The bucket may comprise a recess with an opening and the bucket may further have an exterior surface and a base. A receptacle connector may be configured to be on either one of (or both) of the bucket and the receptacle to allow the receptacle to positively engage the liquid holding device/bucket to allow pivoting therebetween without allowing additional sliding relative motion therebetween during movement of the bucket relative to the receptacle. The bucket may include wheels to facilitate moving the liquid holding device in a shopping cart manner. The bucket may include a second connector configured to engage the first connector on the liquid receptacle to create the pivotal connection therebetween. The liquid may be waste oil.

In a separate aspect, the present invention is related to a bucket configured to hold liquid. The bucket may comprise an exterior surface and be configured to hold liquid and have a base. The bucket may define a recess or chamber configured to receive liquid therein. The bucket may define a bucket mouth or opening in fluid communication with the chamber/recess. The bucket may also comprise a plurality of wheels located on the bucketproximate the base. The bucket may further comprise at least one of a handle and a grip formed by a portion of the exterior surface or by a conventional bucket handle such that a user can lift or drag or roll the bucketto facilitate transport thereof.

In a separate aspect, the present invention may be directed a bucket and a dumpster. The bucket may be configured to hold waste. The bucket may detachably connect to dumpster to assist the user in dumping waste from the hand truck into the dumpster by pivoting the bucket about an axis relative to the dumpster while preventing relative motion—other than the pivoting—between the bucket and the dumpster.

In a separate aspect, the present invention is directed to a combination liquid holding device which is a tank without wheels and liquid receptacle. The combination liquid holding device/tank or container without wheels and liquid receptacle may improve waste fluid management. The tank without wheels may comprise a recess/chamber with an opening and the tank may further have an exterior surface and a base. A receptacle connector may be configured to be on either one of (or both) of the tank and the receptacle to allow the receptacle to positively engage the tank/bucket/handtruck to allow pivoting therebetween without allowing additional sliding relative motion therebetween during movement of the tank/bucket relative to the receptacle (this also preferably prevents relative motion therebetweeen except for the pivoting about the axis when a positive connection is established therebetween). The The liquid may be waste oil.

In a separate aspect, the present invention is related to a tank without wheels configured to hold liquid. The tank may comprise an exterior surface and be configured to hold liquid and have a base. The tank may define a recess or chamber configured to receive liquid therein. The tank may define a mouth or opening in fluid communication with the chamber/recess. The tank may further comprise at least one of a handle and a grip formed by a portion of the exterior surface or by a conventional bucket/tank handle such that a user can lift or drag the tank to facilitate transport thereof.

In a separate aspect, the present invention may be directed a tank without wheels and a dumpster. The tank may be configured to hold waste. The tank may detachably connect to dumpster to assist the user in dumping waste from the tank into the dumpster by pivoting the tank about an axis relative to the dumpster while preventing relative motion—other than the pivoting—between the bucket and the dumpster.

In a separate aspect, the present invention is directed to a combination liquid holding device and liquid receptacle including a liquid holding device. The device may have a device body having an exterior surface and a base. The device body may define a body chamber configured to hold liquid therein. The device body may define a body opening in fluid communication with the body chamber. A liquid receptacle can be positioned on a supporting surface and may have a receptacle body defining a receptacle chamber configured to hold and store liquid. The receptacle body can define a receptacle opening. A connector mechanism may be located on at least one of the liquid holding device and the liquid receptacle such that the connector mechanism is configured to form a detachable positive connection therebetween. The connector mechanism being configured to only allow pivoting about an axis of rotation between the liquid holding device and the liquid receptacle while the liquid holding device is connected to the liquid receptacle via the connector mechanism, the liquid holding device may be rotated such that liquid tends to be biased for movement from the body chamber, through the body opening, through the receptacle opening, and into the receptacle chamber. The connector mechanism could have multiple components with at least one component located on one of the liquid holding device and the liquid receptacle with another component located on the other of the liquid holding device and the liquid receptacle.

In a separate aspect, the present invention is directed to a hand truck configured to hold liquid. The handtruck may include a tank having an exterior surface configured to hold liquid and having a base. The tank defining a tank chamber configured to receive liquid therein. The tank defining a tank opening in fluid communication with the tank chamber. A plurality of wheels located on the tank proximate the base. At least one of a handle and a grip formed by a portion of the exterior surface such that a user can incline and roll the tank to facilitate transport thereof. The hand truck being configured to detachably engage a liquid receptacle to create a pivotal connection such that the hand truck can be pivoted about an axis of rotation relative to the liquid receptacle without allowing any other relative movement between the hand truck and the liquid receptacle, other than the pivoting motion, while the hand truck is engaged with the liquid receptacle.

In a separate aspect, the present invention is directed to a combination liquid holding device and liquid receptacle. The liquid holding device having a device body having an exterior surface and a base. The device body defining a body chamber configured to hold liquid therein. The device body defining a body opening in fluid communication with the body chamber. A liquid receptacle may be positioned on a supporting surface. A receptacle body defining a receptacle chamber is configured to hold and store liquid. A device body lift device is capable of moving between a first, non-pour position and a second, pour position. The liquid holding device being positionable on and/or engageable with the device body lift device, the device body lift device comprising a lift drive configured to assist in moving the device body lift device and the liquid holding device positioned thereon into the second, pour position. The receptacle body defining a receptacle opening. When the liquid holding device is positioned on and/or engaged with the device body lift device and the device body lift device is in the second, pour position the liquid holding device is positioned such that liquid tends to be biased for movement from the body chamber, through the body opening, through the receptacle opening, and into the receptacle chamber.

In a separate aspect, the present invention is directed to a liquid receptacle positioned on a supporting surface. The liquid receptacle including a receptacle body defining a receptacle chamber configured to hold and store liquid. The receptacle body further defining a receptacle opening. A device body lift device position on the receptacle body and capable of moving between a first, non-pour position and a second, pour position, the device body lift device being adapted to have a liquid holding device positioned thereon; the device body lift further comprises: a backrest plate having a first backrest plate axial end pivotally connected to the liquid receptacle, the liquid holding device being positionable on the device body lift device such that the device body is positioned against the backrest plate. A lift bracket positioned on the liquid receptacle. A piston has a first piston end secured on the lift bracket and has a second piston end positioned on the backrest plate such that when the lift device is in the first, non-pour position the piston biases the lift device against rotation and such that when the tank lift device is rotated past a predetermined point the piston provides a lift assist to facilitate moving the lift device into the second, pour position. When the lift device is in the second, pour position the lift device is adapted such that the liquid holding device is positioned such that liquid tends to be biased for movement from the liquid holding device, through the receptacle opening, and into the receptacle chamber.

In a separate aspect, the present invention is directed to a liquid holding device having at least one heat shield located on at least one of the group of a portion the exterior surface adjacent a handle and on the handle to increase safety during grasping of the liquid holding device.

In a separate aspect, the present invention is directed to a liquid holding device having at least one heat shield located on a portion the exterior surface configured to enhance safety when the portion of the exterior surface contacts a portion of a person's body, other than the hands of the person, during transport of the liquid holding device.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. It is understood, however, that the invention is not limited to the precise arrangements and instrumentalities shown. In the drawings:

FIG. 27 is a side view of a combination liquid holding device and liquid receptacle 100 in the alternative preferred embodiment. This figure illustrates how the piston 126 may actuate the tank lift device 110 and assist the user in rotating the liquid holding device 10 into the second horizontal position 80 for dumping. The piston 126 may be biased for pushing outwardly and extending axially. Before the backrest plate 118 reaches a predetermined point 136 during rotation, the piston 126 may bias the tank lift device 110, and therefore the liquid holding device 10, toward the first vertical position 78. After the backrest plate 118 passes the predetermined point 136 during rotation, the piston 126 may bias the tank lift device 110, and therefore the liquid holding device 10, toward the second horizontal position 80. The liquid holding device 10 may also have a center of gravity C.

Figure 1:
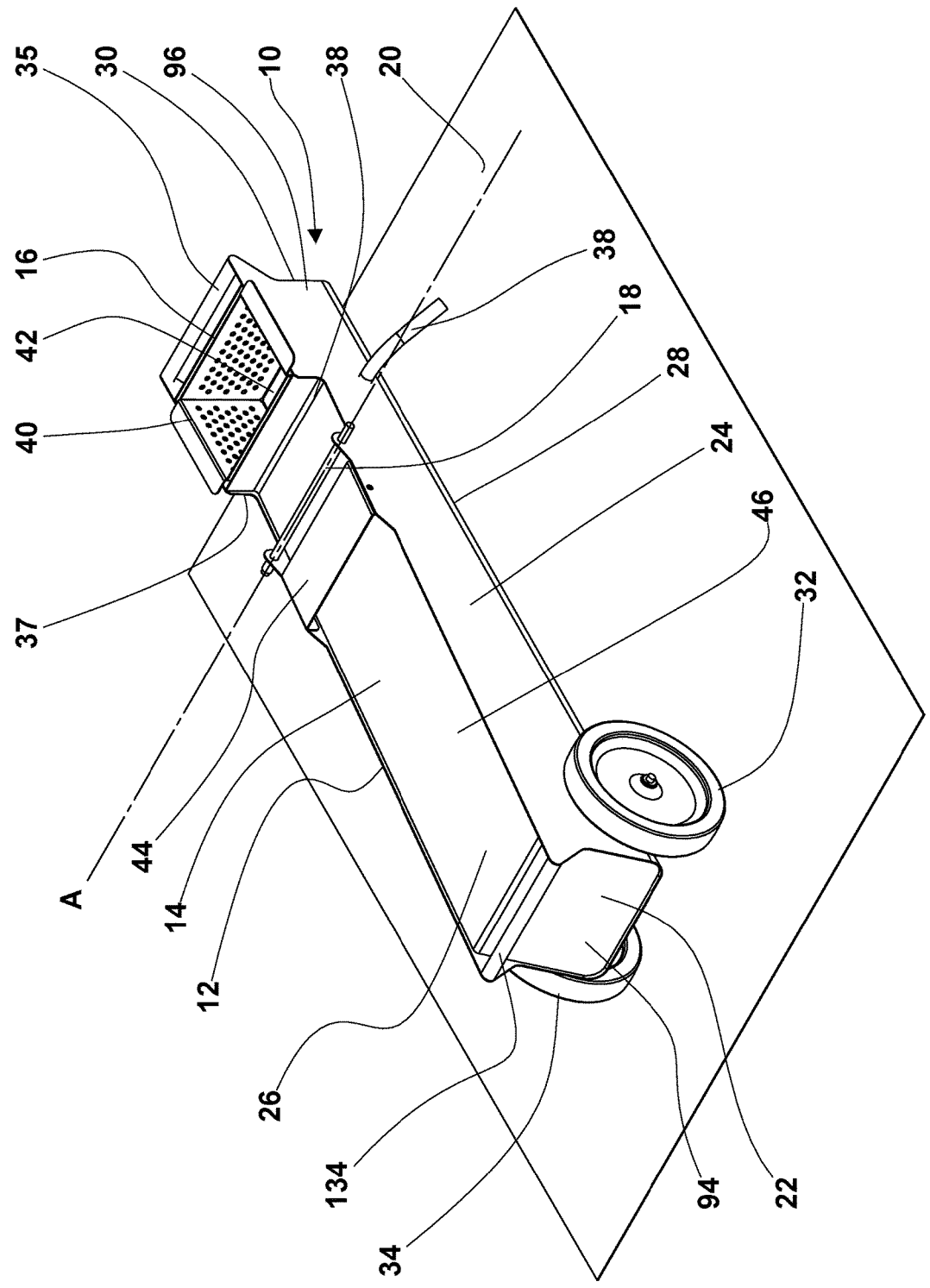
FIG. 1 is a front perspective view of a liquid holding device 10 in the preferred embodiment. This figure shows that the liquid holding device 10 may comprise a tank 12. The tank may have an exterior surface 14, and a tank opening 16 may be located toward a top 30 of the liquid holding device 10. An attachment bar 18 may be located on the tank 12 in a spaced apart fashion from the exterior surface 14. A brace 44 may be located axially closer to the base 22 than the attachment bar 18. The attachment bar 18 may be located on a same side 46 of the tank 12 as the tank opening 16. The tank 12 may have a base 22, a side 24, a front 26, and a back 28. The liquid holding device 10 may lie on a supporting surface 20. The liquid holding device 10 may also be configured for a plurality of wheels 32, 34 to attach toward the base 22. An axis of rotation A may extend axially through the center of the attachment bar 18. The device may be entirely manually/hand driven and be free of (and/or not use) any motors, hydraulics, or electrical devices. The base 22 may be located at a first axial end 94 of the tank 12. The top 30 may be located at a second axial end 96 of the tank 12.

The device body 162 may define a body chamber 164 contained therein. The opening 154 may comprise a body opening 166. The opening 154 may face upwards and opposite the supporting surface 20. A heat shield 160 may be configured to wraparound or partially encapsulate the device body 162.

Figure 36:
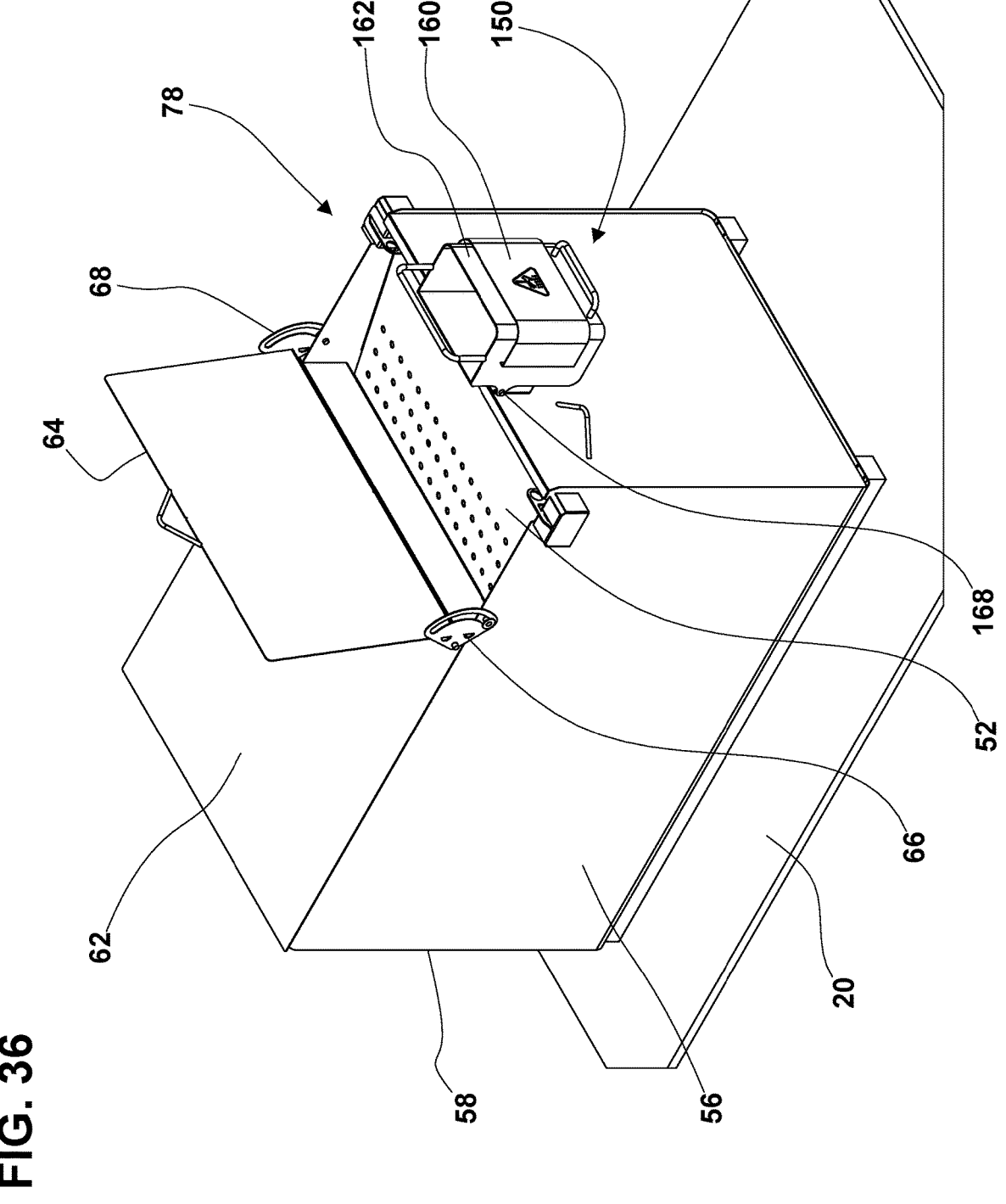

FIG. 36 is a front perspective view of a combination liquid holding device and liquid receptacle 100 in the alternative preferred embodiment. The liquid holding device 10 may comprise a bucket 150. The bucket 150 may define a recess or chamber 152 contained therein. The bucket 150 may also have an opening 154 for liquid to pass through either into or out of the recess 152. The bucket 150 may further comprise a second connector 158 configured to detachably engage with a receptacle connector 156 attached to the liquid receptacle 50. The bucket 150 is shown in a first, non-pour position 112.

Figure 37:
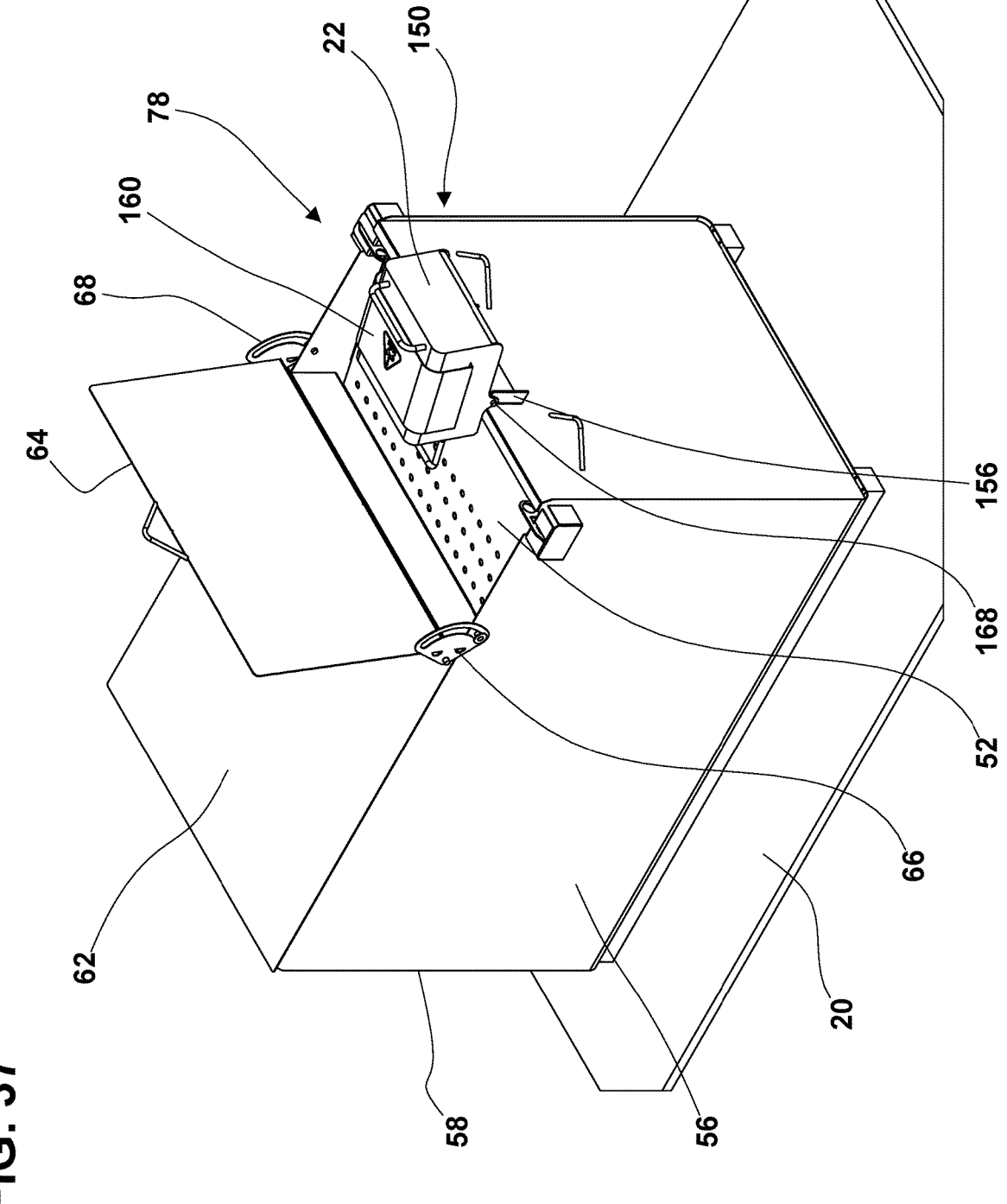

FIG. 37 is a front perspective view of the combination liquid holding device and liquid receptacle 100 in the alternative preferred embodiment. Here, the bucket 150 is shown in a second, pour position 114.

Figure 38:
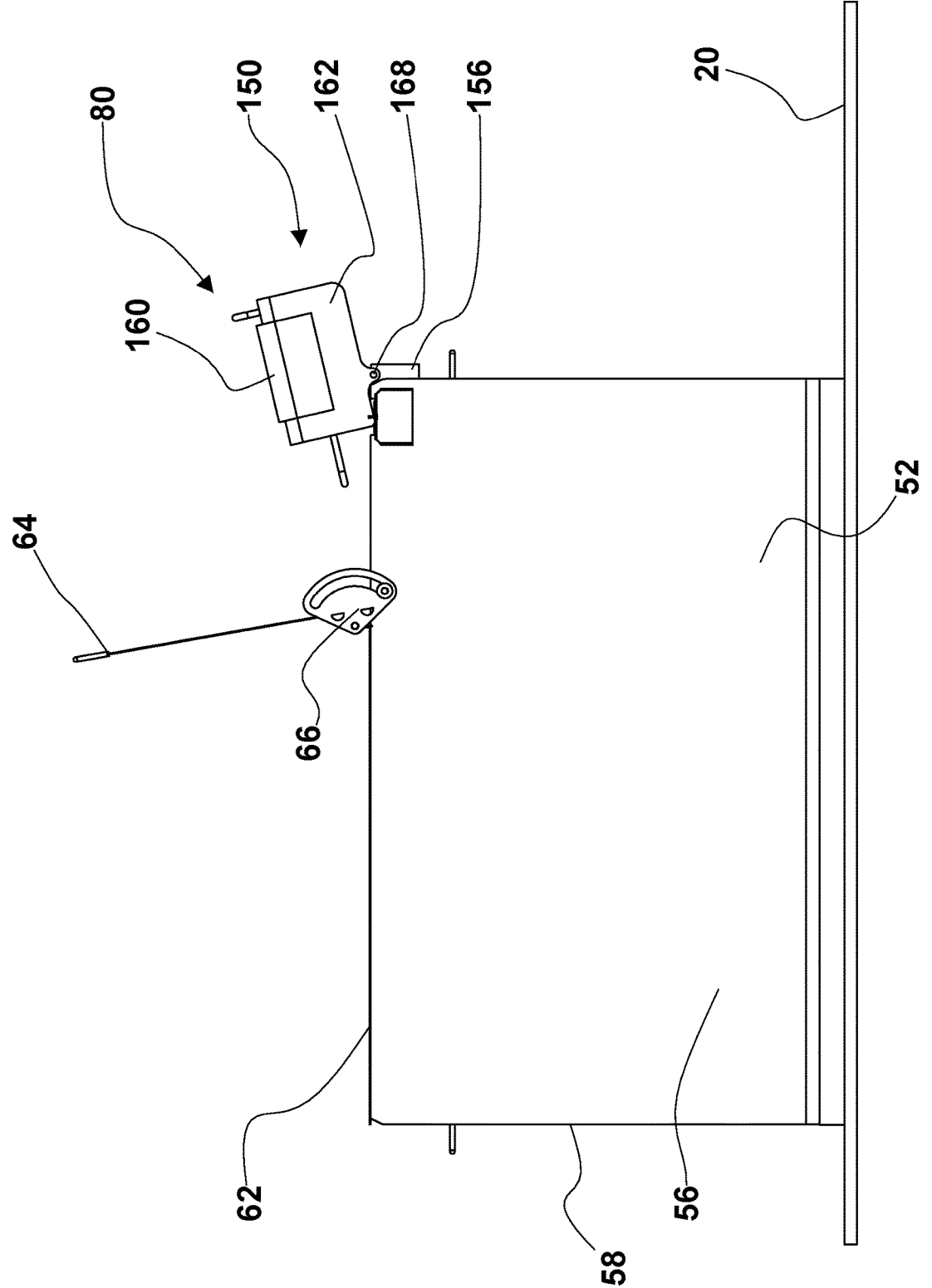

FIG. 38 is a side view of the combination liquid holding device and liquid receptacle 100 in the alternative preferred embodiment. Here, the bucket 150 is shown in a second, pour position 114. A connector mechanism 168 may also be seen. The connector mechanism 168 may comprise a receptacle connector 156 and/or a second connector 158. The connector mechanism 168 may be detachable or fixed.

DETAILED DESCRIPTION OF THE PREFERRED EMBODIMENT

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the combination liquid holding device and liquid receptacle 100, the liquid holding device 10, and/or the liquid receptacle 50. The terms "downward" and "upward refers to directions above (or away from) and below (or toward) the supporting surface 20 during operation, respectively, unless specified otherwise. The terms "forward" and "front" refer to a direction in front of the combination liquid holding device and liquid receptacle 100, the liquid holding device 10, and/or the liquid receptacle 50, and the term "rear" and back refers to a direction behind the combination liquid holding device and liquid receptacle 100, the liquid holding device 10, and/or the liquid receptacle 50. The terms "axial" and "radial" refer to directions along the axis of rotation A and around the axis of rotation A, respectively. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Those of ordinary skill in the art will appreciate from this disclosure that skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C'; —and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Referring generally to FIGS. 1-38, wherein like numerals indicate like elements throughout, a combination liquid holding device and liquid receptacle 100 is disclosed in its preferred embodiment. The present invention may also relate to a liquid hand truck and a liquid receptacle, either in combination or each in a stand-alone fashion. One of ordinary skill in the art would appreciate from this disclosure that the present invention may be used to transport, hold, and store various waste materials, including waste oil, without departing from the scope of the present invention. The device may be entirely manually/hand driven and be free of (and/or not use) any motors, hydraulics, electrical devices, or similar drive producing mechanisms.

Figure 2:
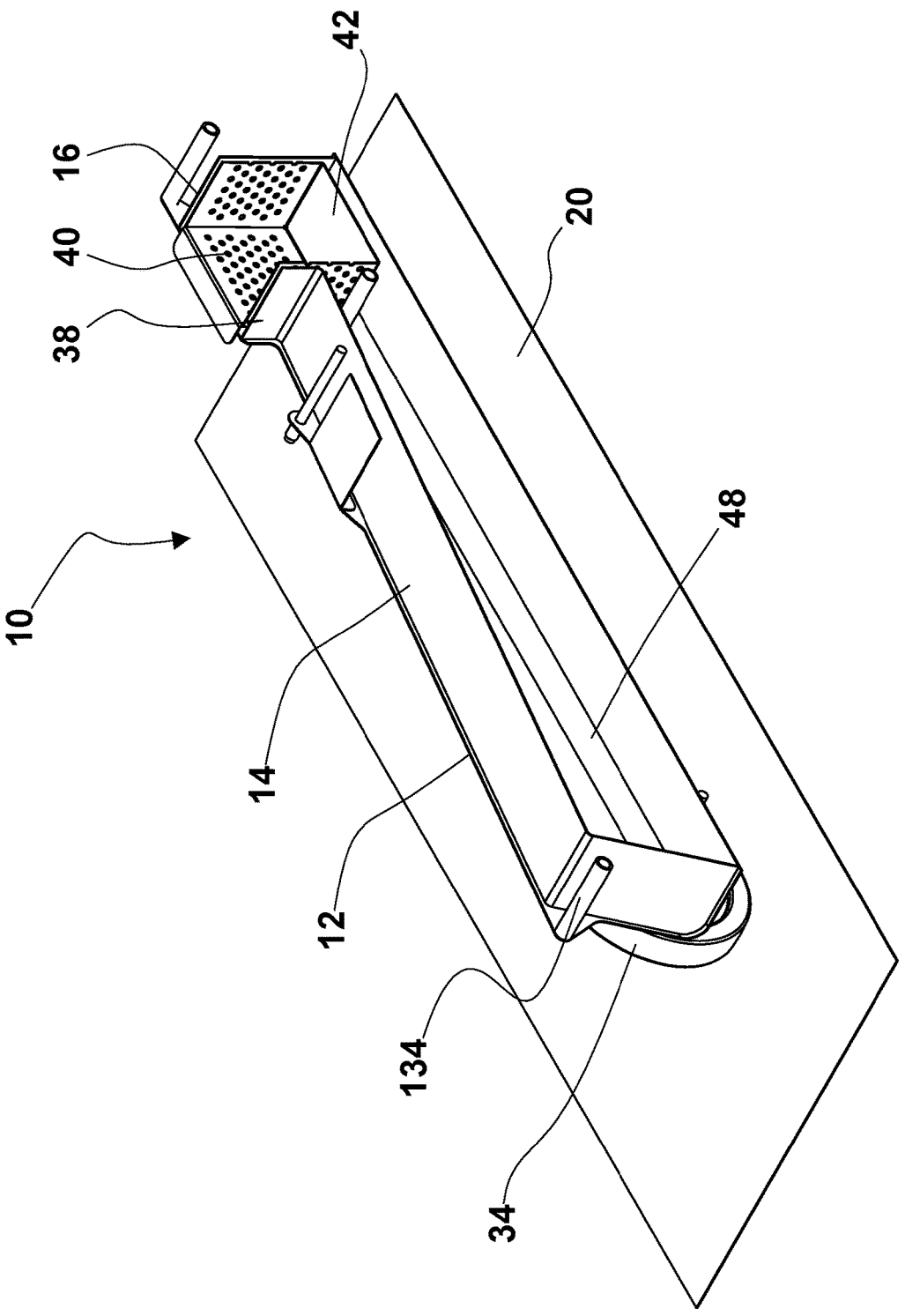
FIG. 2 is a front perspective, cross-sectional view of a liquid holding device 10 in the preferred embodiment. This figure illustrates the sidewall 37 of the tank 12 forming a collar 38. The collar 38 may surround and form the tank opening 16. A first filtering insert 40 may be configured to sit inside the tank opening 16 and reduce an amount of unwanted particulates from entering a tank chamber 48 contained within the tank 12. It can be seen how the tank opening 16 may be in fluid communication with the tank chamber 48. The first filtering insert 40 may also comprise a splash guard 42 configured to reduce the amount of liquid from inadvertently escaping the tank chamber 48 via the tank opening.
Figure 3:
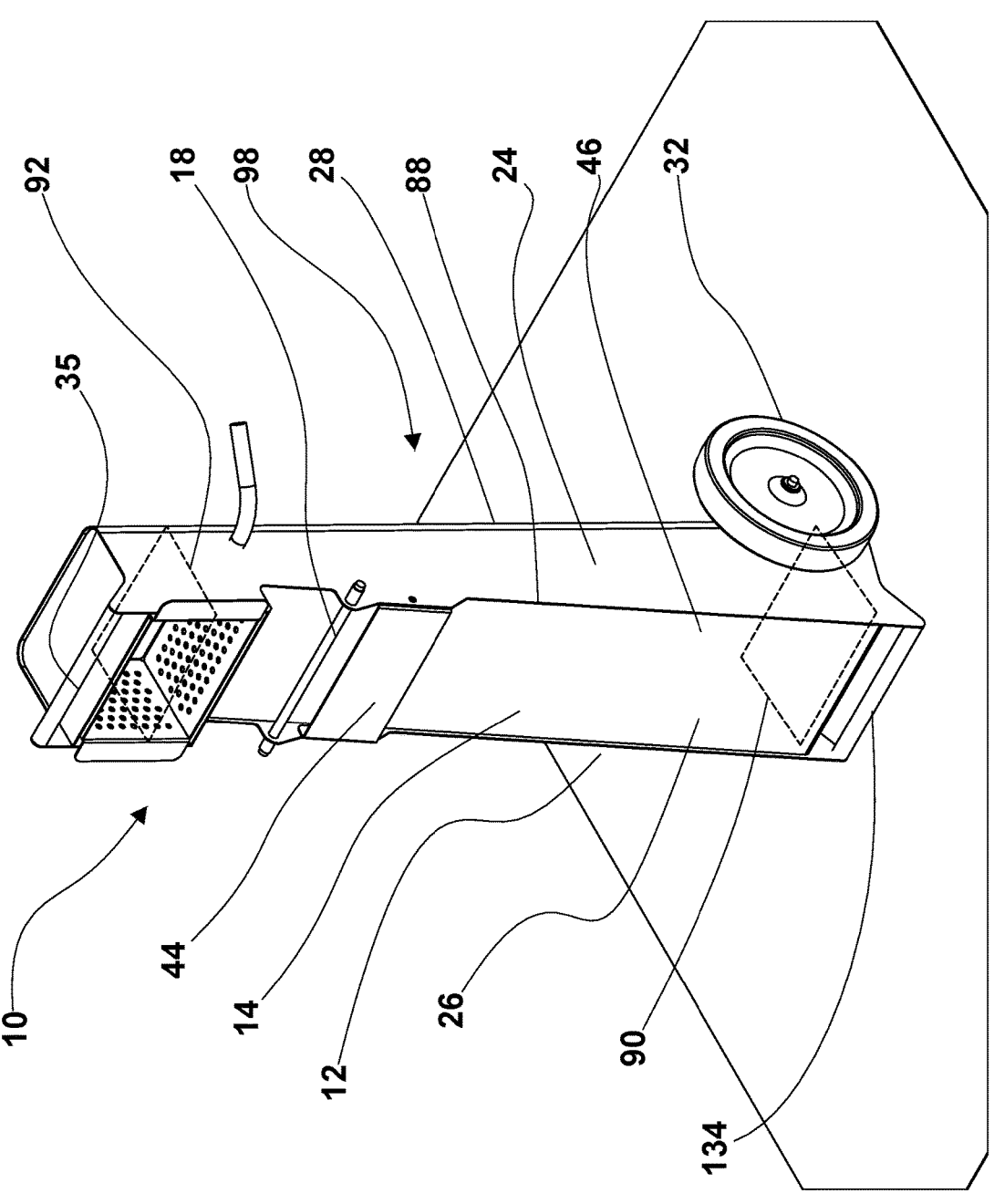
FIG. 3 is a front perspective view of a liquid holding device 10 in the preferred embodiment. This figure illustrates the liquid holding device 10 in a stationary upright position 98. The tank 12 of the liquid holding device 10 may have a tapered shape 88. The tapered shape 88 may be formed by a first area 90 of the tank 12 located near the base 22 which is greater than a second area 92 of the tank 12 located near the top 30. A handle 36 forming a grip 35 may also protrude from the side or sides 24 of the tank 12.

Referring generally now to FIGS. 1-3, a liquid holding device 10 of the combination 100 may be seen. The liquid holding device 10 may comprise a tank 12. The tank 12 may have an exterior surface 14 located on a front 26. The tank 12 may further have a base 22, sides 24, a back 28, and a top 30. In the exterior surface 14, a tank opening 16 may be formed sharing a common edge with the top 30. The liquid holding device 10 may further comprise an attachment bar 18 connected to the exterior surface 14 in a spaced apart fashion. The attachment bar 18 and the tank opening 16 may be located on a same side 46 of the tank 12. The attachment bar 18 may be further supported by a brace 44 also located on the same side 46 of the tank 12.

Referring still to FIGS. 1-3, the liquid holding device 10 may comprise a plurality of wheels 32, 34. The plurality of wheels 32, 34 may be connected by an axle on the back 28 of the tank 12. The plurality of wheels 32, 34 may lie outwardly from the sides 24. Further, a grip 35 may be formed and protrude from the top 30. The grip 35 may be utilized by a user 82 in order to pull or push the liquid hand truck. Protruding from the sides 24, handles 36 may also be used in a similar fashion as the grip 35. Extending outwardly from the exterior surface 14, sidewalls 37 may surround and define the tank opening 16. The sidewalls 37 may form a collar 38.

Referring specifically to FIG. 2, a tank chamber 48 may be defined within the tank 12. The tank chamber 48 may be configured to hold and store waste liquid, especially waste oil. The tank chamber 48 may be in fluid communication with the tank opening 16. A first filtering insert 40 may be configured to sit inside of the tank opening 16. The purpose of the first filtering insert 40 may be to stop particulates and other unwanted foreign matter from entering the tank chamber 48 when the desired waste liquid enters. The first filtering insert 40 may also comprise a splash guard 42. The splash guard 42 may be configured to stop waste liquid from exiting the tank chamber 48 via the tank opening 16 when the liquid holding device 10 is transported from one location to another.

Referring specifically to FIGS. 1 and 2, the liquid holding device 10 may be supported on a support surface 20. The liquid holding device 10 may lay flatly on the support surface 20 and be held up by the plurality of wheels 32, 34 at one end and the handles 36 at the other. In order to fill the liquid holding device 10 with waste liquid, especially waste kitchen oil, the liquid holding device 10 may be laid down flatly underneath a spout, hose, or other emptying valve of the fryer or other device that uses oil. The waste oil may then flow out of the kitchen device through the tank opening 16 and into the tank chamber 48.

One of ordinary skill in the art would appreciate from this disclosure that the tank chamber 48 may have a capacity of at least 10 gallons without departing from the scope of the present invention.

Referring specifically to FIG. 3, the liquid holding device 10 may be in a stationary upright position 98. The base 22 may be configured to support the rest of the device 10 on a supporting surface 20 in the stationary upright position 98. The liquid holding device 10 may also have a tapered shape 88 such that a first area 90 located within the tank chamber 48 is greater than a second area 92 located within the tank opening 16. The tapered shape 88 may allow the tank chamber 48 to have greater volume without the risk of waste liquid inadvertently splashing out through a narrower top.

Figure 4:
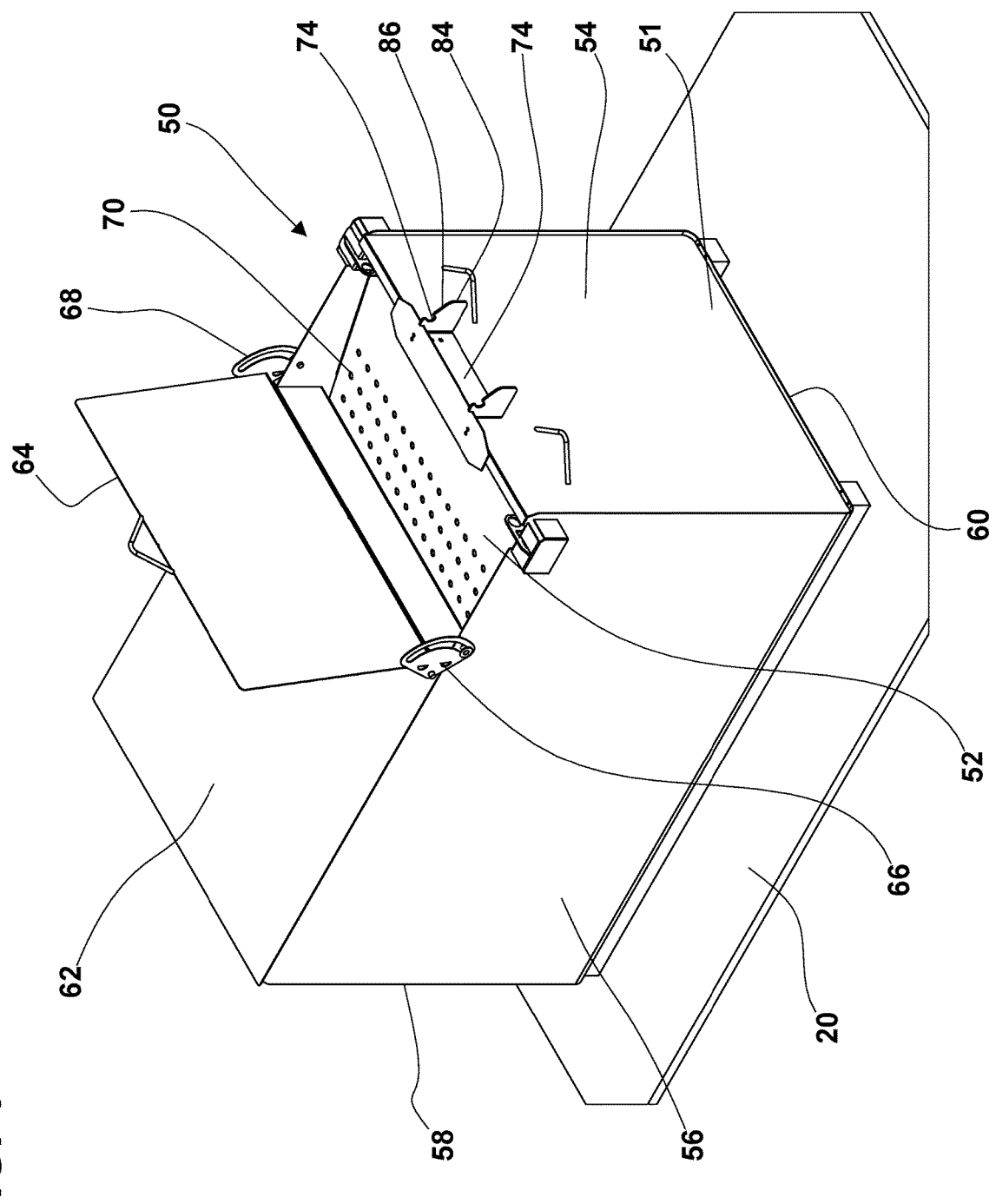
FIG. 4 is a front perspective view of a liquid receptacle 50 in the preferred embodiment. This figure shows the liquid receptacle 50 on the supporting surface 20. The liquid receptacle 50 may comprise a receptacle body 51. The receptacle body 51 may comprise a receptacle opening 52 located in a topside 62 which may share a common edge with a frontside 54. The receptacle body 51 may further comprise receptacle sides 56, a backside 58, and a bottom side 60. A lid 64 may be configured to close off the receptacle opening 52. The lid 64 may be connected to the topside 62 via hinges 66, 68. The hinges 66, 68 may allow for the lid 64 to rotate through an arcuate path, opening or closing the receptacle opening 52.
Figure 5:
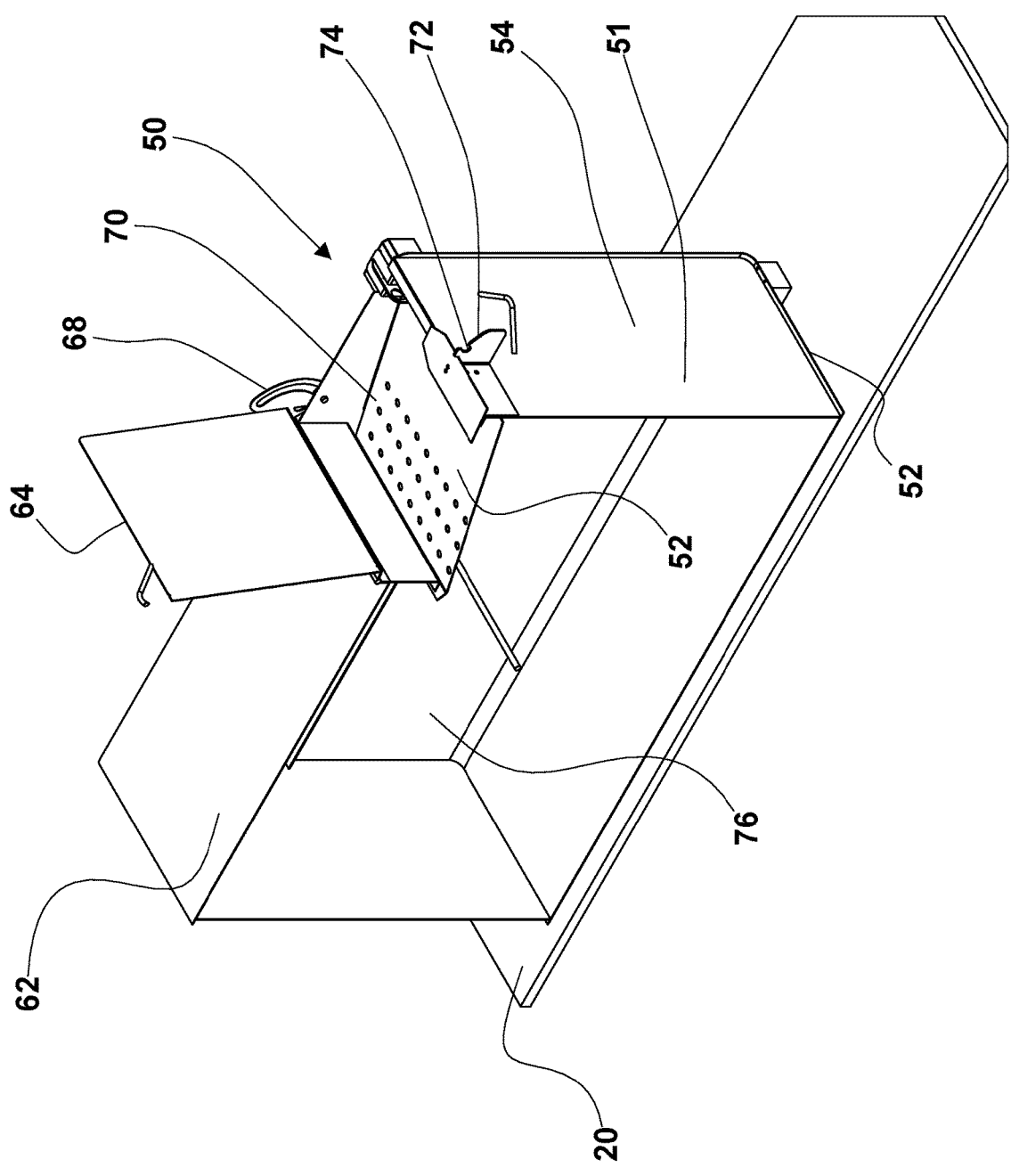
FIG. 5 is a front perspective view of a liquid receptacle 50 in the preferred embodiment. Here, a second filtering insert 70 may be seen partially seated in the receptacle opening 52 and reduce an amount of unwanted particulates from entering a receptacle chamber 76 contained within the receptacle body 51. The receptacle chamber 76 may be in fluid communication with the receptacle opening 52. A receptacle bracket 72 may also be attached to the frontside 54 of the receptacle body 51. The receptacle bracket 72 may comprise a mounting slot 74 configured to detachably mount the attachment bar 18 (see FIGS. 1-3).
Figure 6:
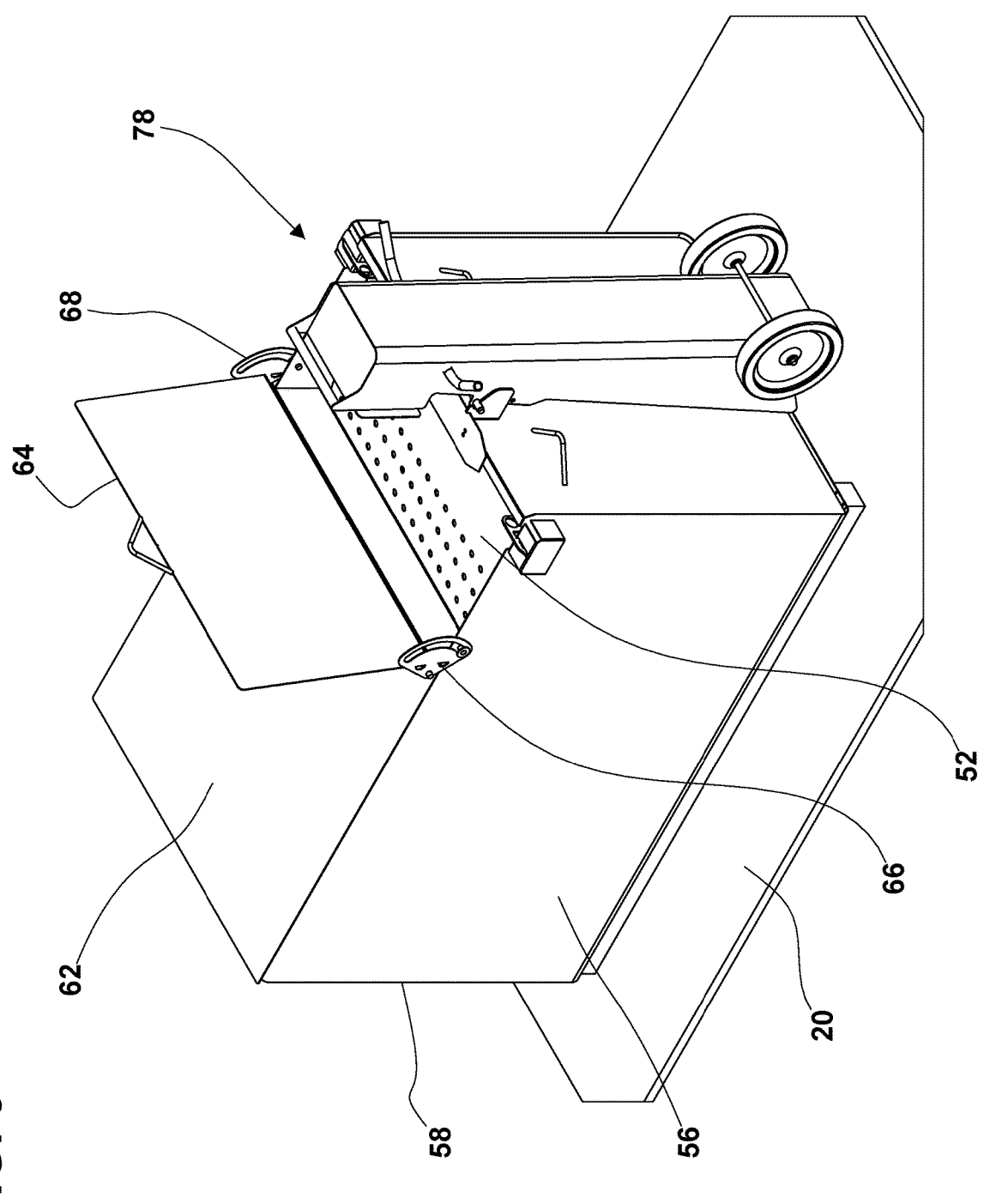
FIG. 6 is a front perspective view of a combination liquid holding device and liquid receptacle 100 in the preferred embodiment. Here, the figure highlights how the attachment bar 18 may be configured to detachably connect to the receptacle bracket 72. The attachment bar 18 may be configured to fit into the slot 74. The axis of rotation A may run axially through the radial centers of the attached bar 18 in the slot 74. The liquid holding device 10 when connected to the liquid receptacle 50 may be in the first vertical position 78.

Referring generally now to FIGS. 4 and 5, a liquid receptacle 50 of the combination 100 may be seen. The liquid receptacle 50 may comprise a receptacle body 51. The receptacle body 51 may form a receptacle opening 52 in a top side 62 that shares a common edge with a front side 54. The liquid receptacle 50 may further comprise receptacle sides 56, backside 58, and a bottom side 60. Hinges 66, 68 located on the top side 62 may be configured to allow a lid 64 to both open and close the receptacle opening 52. Contained within the receptacle opening 52, a second filter insert 70 may be configured to reduce an amount of unwanted particulates and other foreign matter from entering through the receptacle opening 52 with the desired liquid.

As can best be seen in FIG. 4, a receptacle bracket 72 may be attached to, or integrally formed with, the front side 54 of the receptacle body 51. The receptacle bracket 72 may form a mounting slot 74. The mounting slot 74 may be configured to receive an attachment bar 18. The receptacle bracket 72 may further comprise a free end 84 extending outwardly and away from the front side 54. Spanning a distance from the free end 84 to the front side 54, a ramp section 86 may slope upwardly toward the mounting slot 74.

As can best be seen in FIG. 5, the receptacle body 51 may define a receptacle chamber. The receptacle chamber 76 may be in fluid communication with the receptacle opening 52. The receptacle chamber 76 may be configured to hold and store liquid or other waste materials. Preferably, but not necessarily, the receptacle chamber 76 may be configured to hold at least 40 gallons.

Referring generally now to FIGS. 6-12, a combination liquid holding device and liquid receptacle 100 is disclosed in the preferred embodiment. FIGS. 6-9 may show the combination 100 in a first, vertical position 78. Here, the liquid holding device 10 may be detachably affixed to the liquid receptacle 50. In the first, vertical position 78, liquid holding device 10 is generally perpendicular to the supporting surface 20. "Generally perpendicular to the supporting surface 20" preferably means that the back 28 of the liquid holding device 10 forms at least a forty-five-degree (45°) angle with the supporting surface 20. More preferably, "generally perpendicular to the supporting surface 20" means that the back 28 of the liquid holding device 10 forms at least a sixty-degree (60°) angle with the supporting surface 20. More preferably still, "generally perpendicular to the supporting surface 20" means that the back 28 of the liquid holding device 10 forms at least an eighty-degree (80°) angle with the supporting surface 20. Most preferably, "generally perpendicular to the supporting surface 20" means that the back 28 of the liquid holding device 10 forms a ninety-degree (90°) angle with the supporting surface 20.

Figure 7:
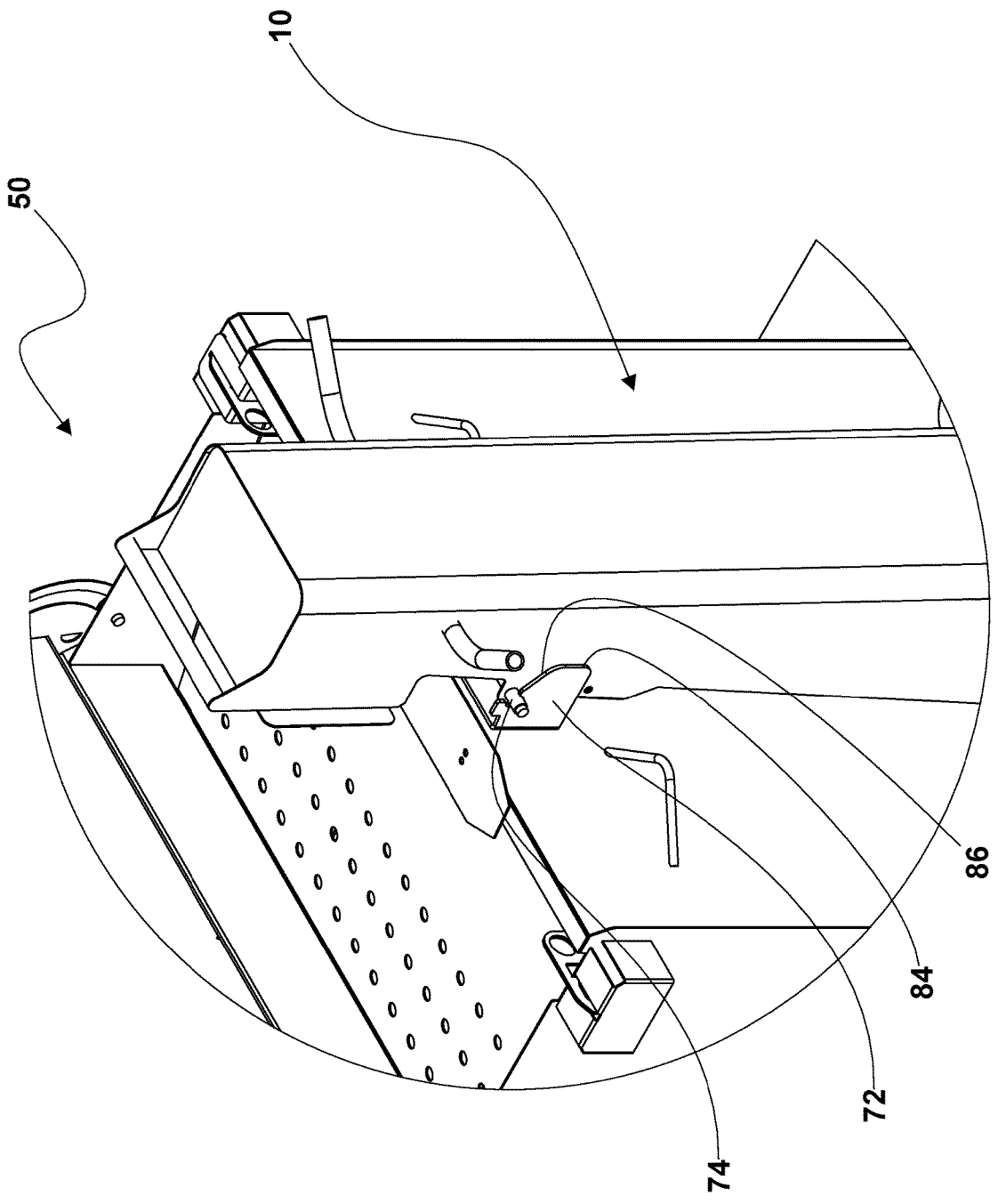
FIG. 7 is a close-up, perspective view of the combination liquid holding device and liquid receptacle 100 of FIG. 6. Here, receptacle bracket 72 may comprise a free end 84. Between the free end 84 and the connection of the receptacle bracket 72 on the liquid receptacle 50, a ramp section 86 may be configured to allow the axial ends of the attachment bar 18 to roll and/or slide up into the mounting slot 74.
Figure 8:
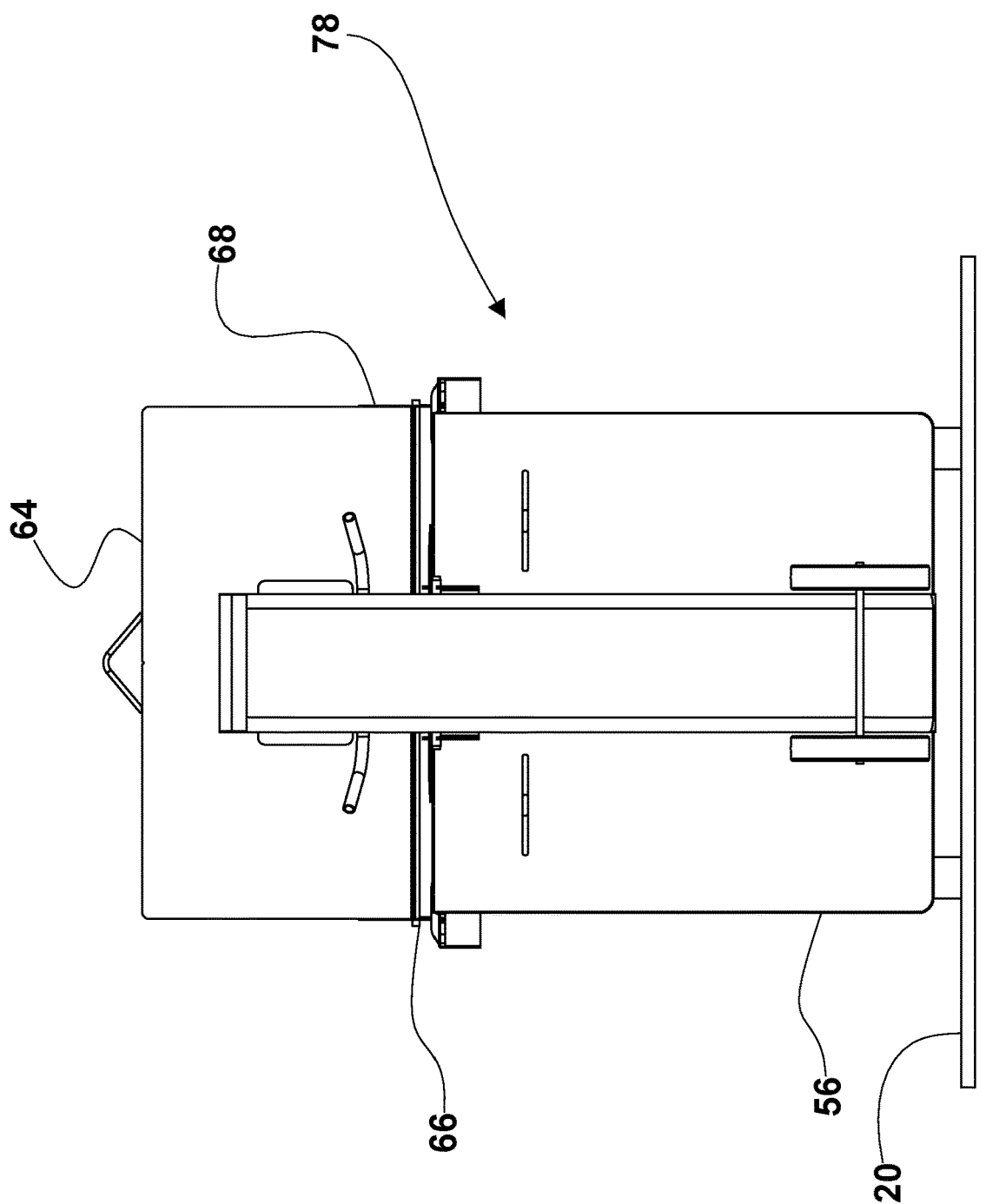
FIG. 8 is a front view of a combination liquid holding device and liquid receptacle 100 in the preferred embodiment. It can be seen that the liquid holding device 10 when engaged with the liquid receptacle 50 may be lifted slightly above and separated from the supporting surface 20. This may allow the liquid holding device 10 to be freely rotated the axis of rotation A without being obstructed by the supporting surface 20.
Figure 9:
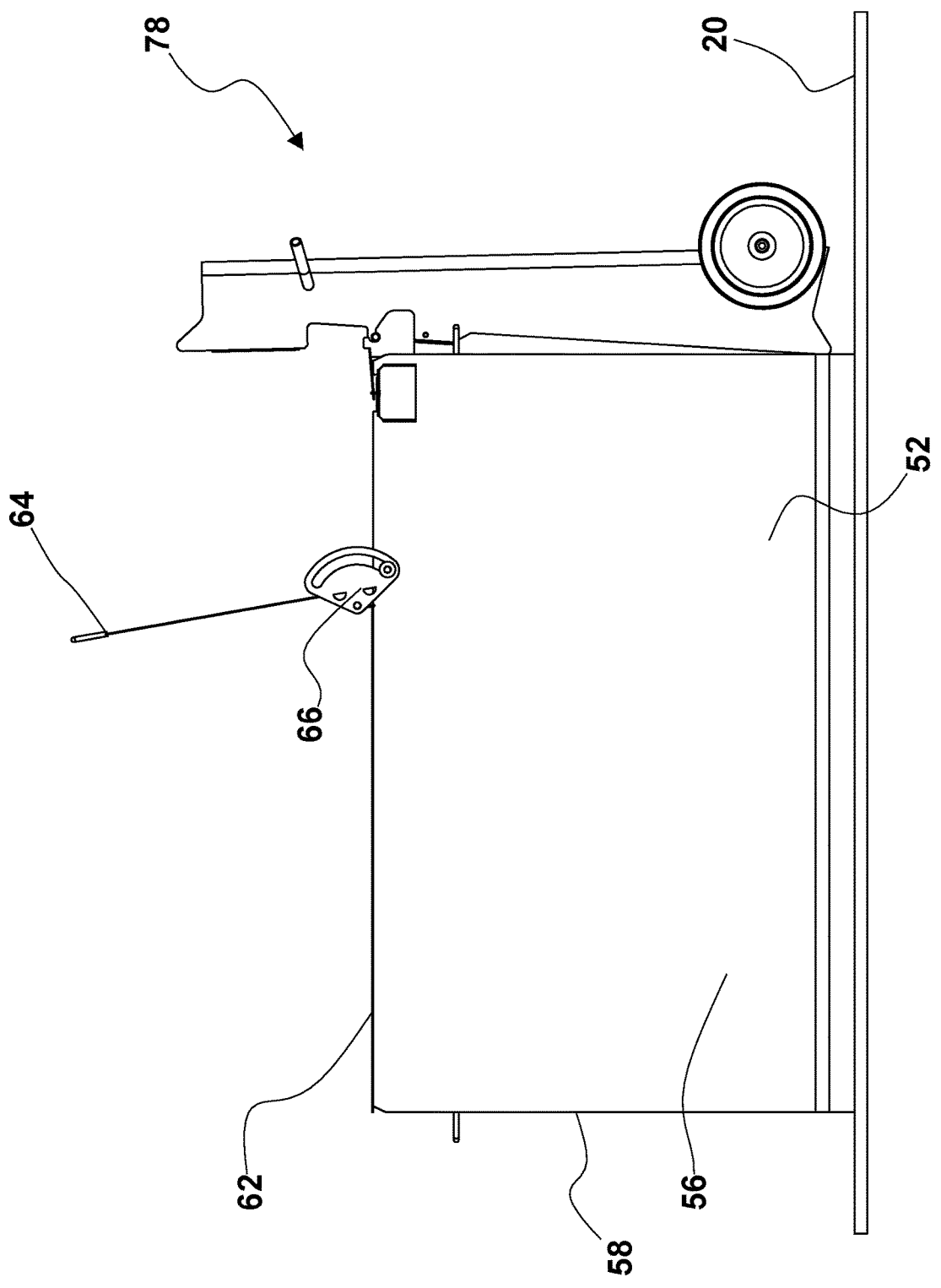
FIG. 9 is a side view of a combination liquid holding device and liquid receptacle 100 in the preferred embodiment. This figure illustrates the liquid holding device 10 in the first vertical position 78 before being rotated about the axis of rotation A. Here, the liquid holding device 10 may either be rotated for dumping or dismounted from the liquid receptacle 50.

Referring specifically to FIG. 7, the attachment of the liquid holding device 10 to the liquid receptacle 50 can best be seen. The mounting slot 74 of the receptacle bracket 72 may be configured to receive the attachment bar 18 located on an exterior surface 14 of the liquid holding device 10. The axial ends of the attachment bar 18 may ride, roll, or slide along the ramp section 86 and into the mounting slot 74. When the attachment bar 18 may be seated in the mounting slot 74, liquid holding device 10 may be detachably connected to the liquid receptacle 50 and ready to be rotated for dumping. One of ordinary skill in the art would appreciate from this disclosure that the contact between the attachment bar 18 and the mounting slot 74 may be that of any sufficiently low-friction and wear-resistant materials, lubricants, and other suitable elements without departing from the scope of the present invention.

Figure 10:
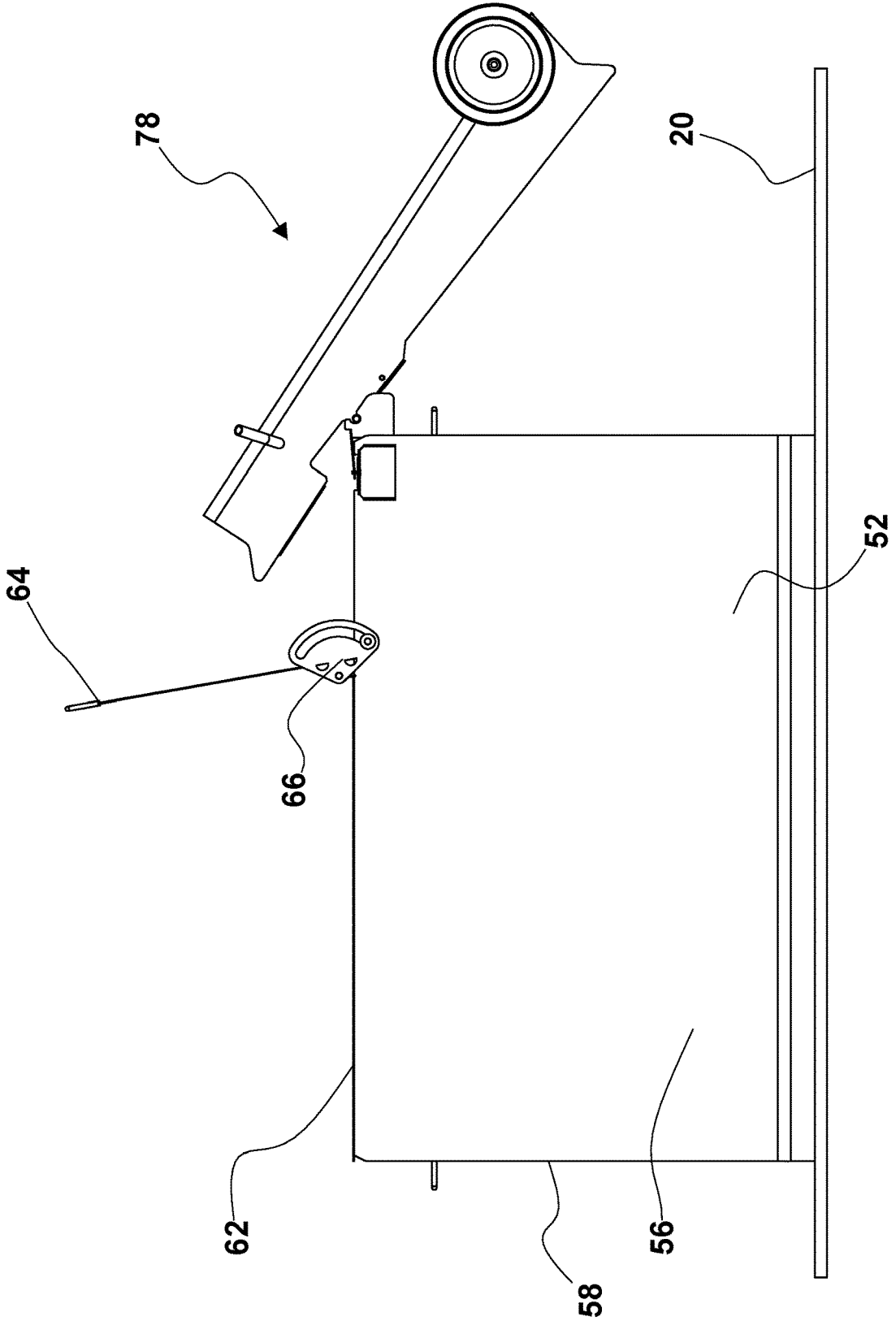
FIG. 10 is a side view of a combination liquid holding device and liquid receptacle 100 in the preferred embodiment. Here, the liquid holding device 10 may be either rotated toward a second horizontal position 80 whereby liquid may be dumped into the liquid receptacle 50 or toward the first vertical position 78 for dismounting from the liquid receptacle 50.

Referring specifically now to FIG. 10, the liquid holding device 10 can be seen being rotated about the axis of rotation A from the first, vertical position 70 to the second, horizontal position 80. The liquid holding device 10 may be in any angular position between the first, vertical position 78 and the second, horizontal position 80. This figure also highlights how the liquid holding device 10 may be free to rotate through an arcuate path about the axis of rotation A.

Figure 11:
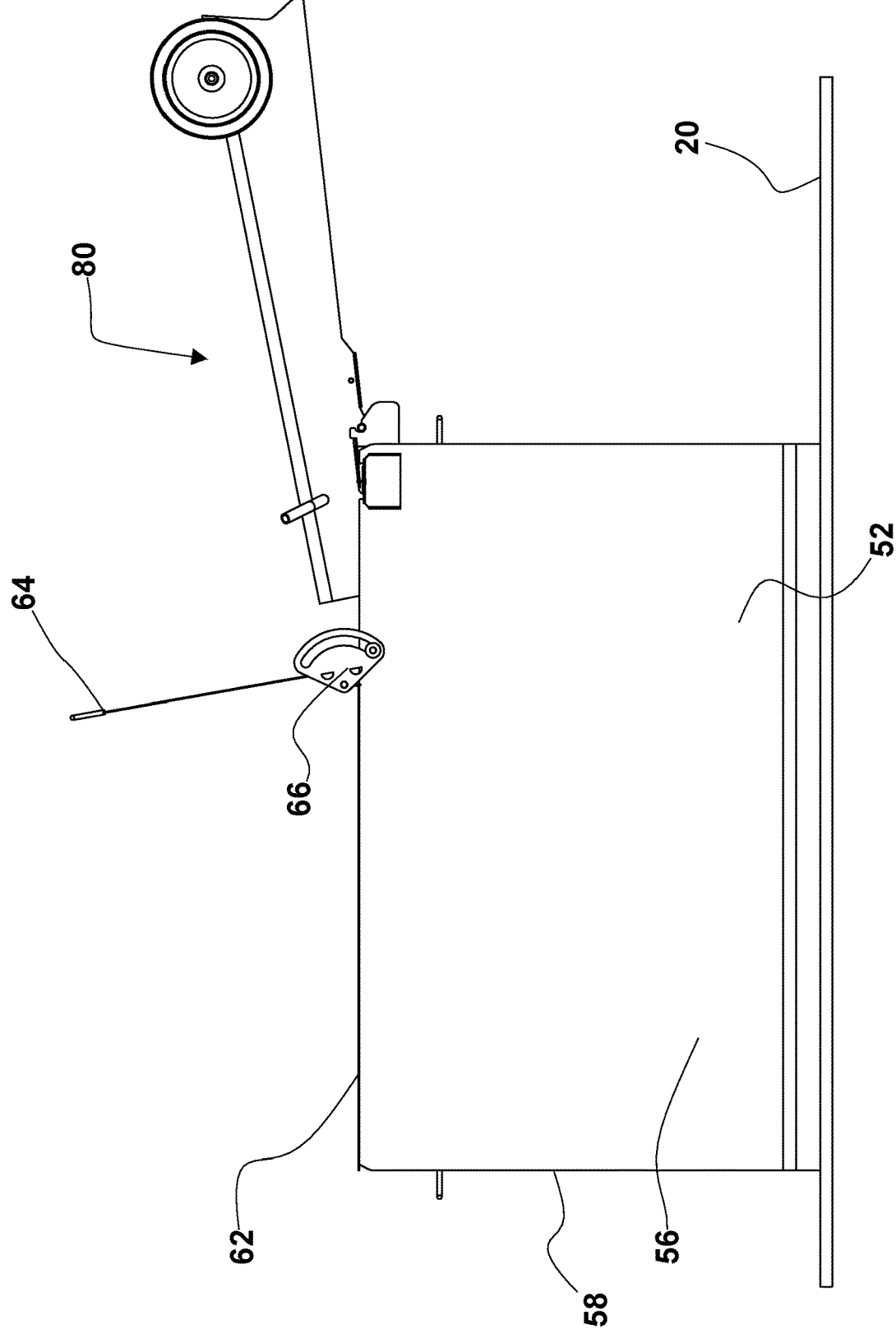
FIG. 11 is a side view of a combination liquid holding device and liquid receptacle 100 in the preferred embodiment. Here, the liquid holding device 10 may be seen in the second horizontal position 80. In the second horizontal position 80, liquid may tend to be biased from the tank chamber 48 via the tank opening 16 through the receptacle opening 52 into the receptacle chamber 76.
Figure 12:
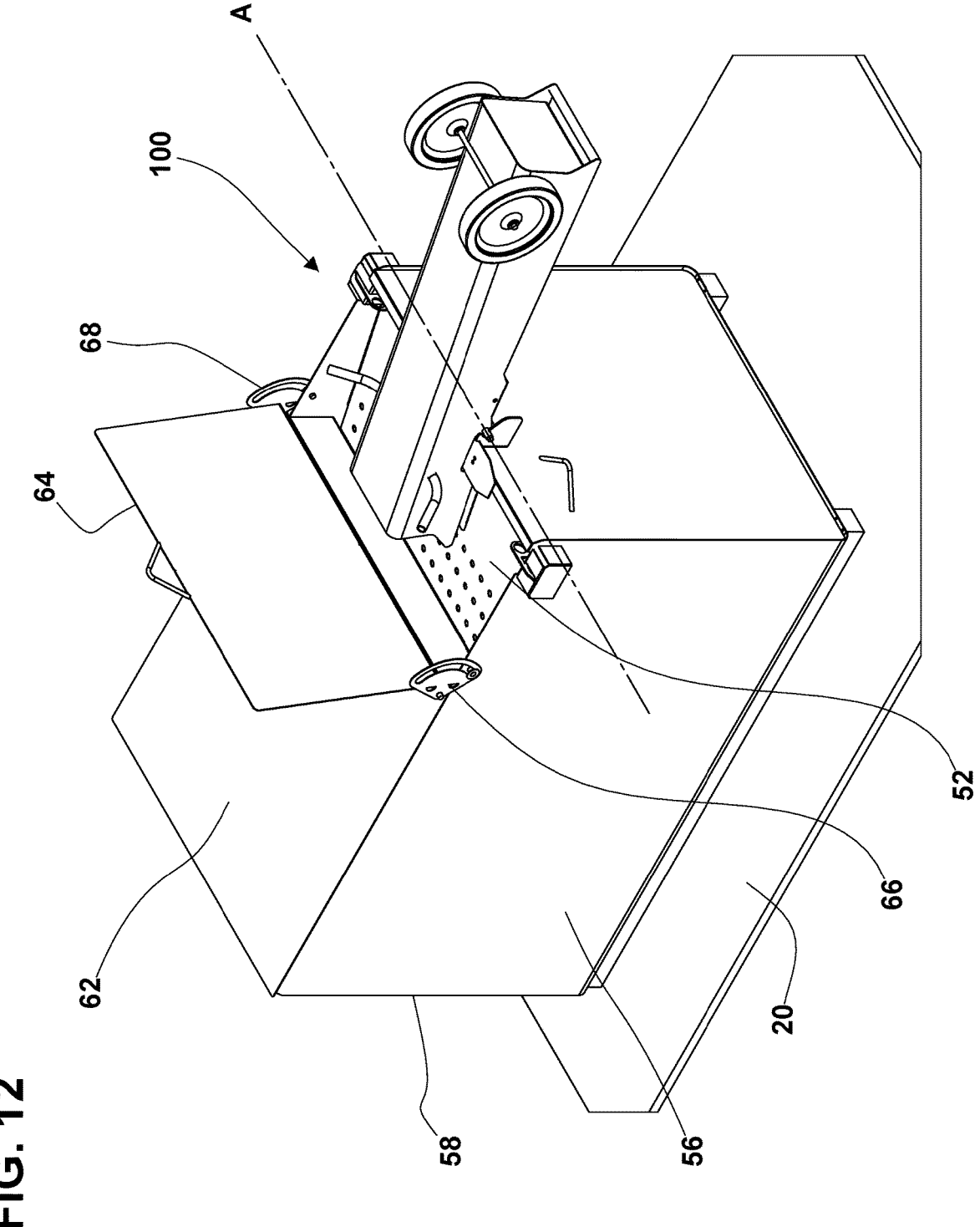
FIG. 12 is a front perspective view of a combination liquid holding device and liquid receptacle 100 in the preferred embodiment. It may be seen that the liquid holding device 10 has been rotated about the axis of rotation A into the second horizontal position 80. The sidewall 37 forming the collar 38 may extend into the receptacle opening 52.
Figure 13:
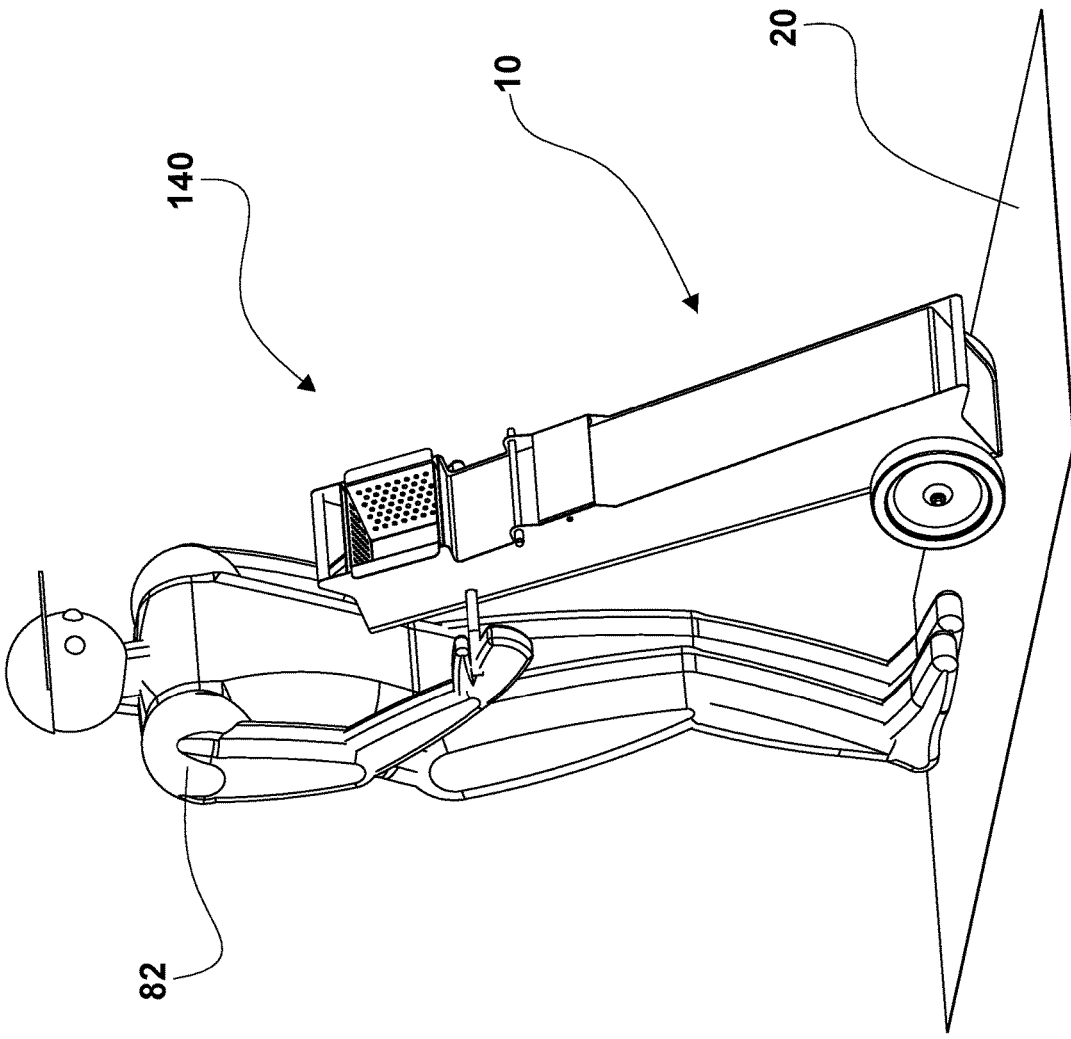
FIG. 13 is a front perspective view of a liquid holding device 10 in the preferred embodiment. Here, it can be seen how a user 82 may engage the liquid holding device 10. The plurality of wheels 32, 34 may be in contact with the supporting surface 20. No other elements of the liquid holding device 10 may be in contact with the supporting surface 20. The user 82 may engage liquid holy device 10 by grasping or otherwise utilizing the handles 36 forming the grips 35. In this way, the liquid holding device 10 may be used in a similar fashion as a hand truck.
Figure 14:
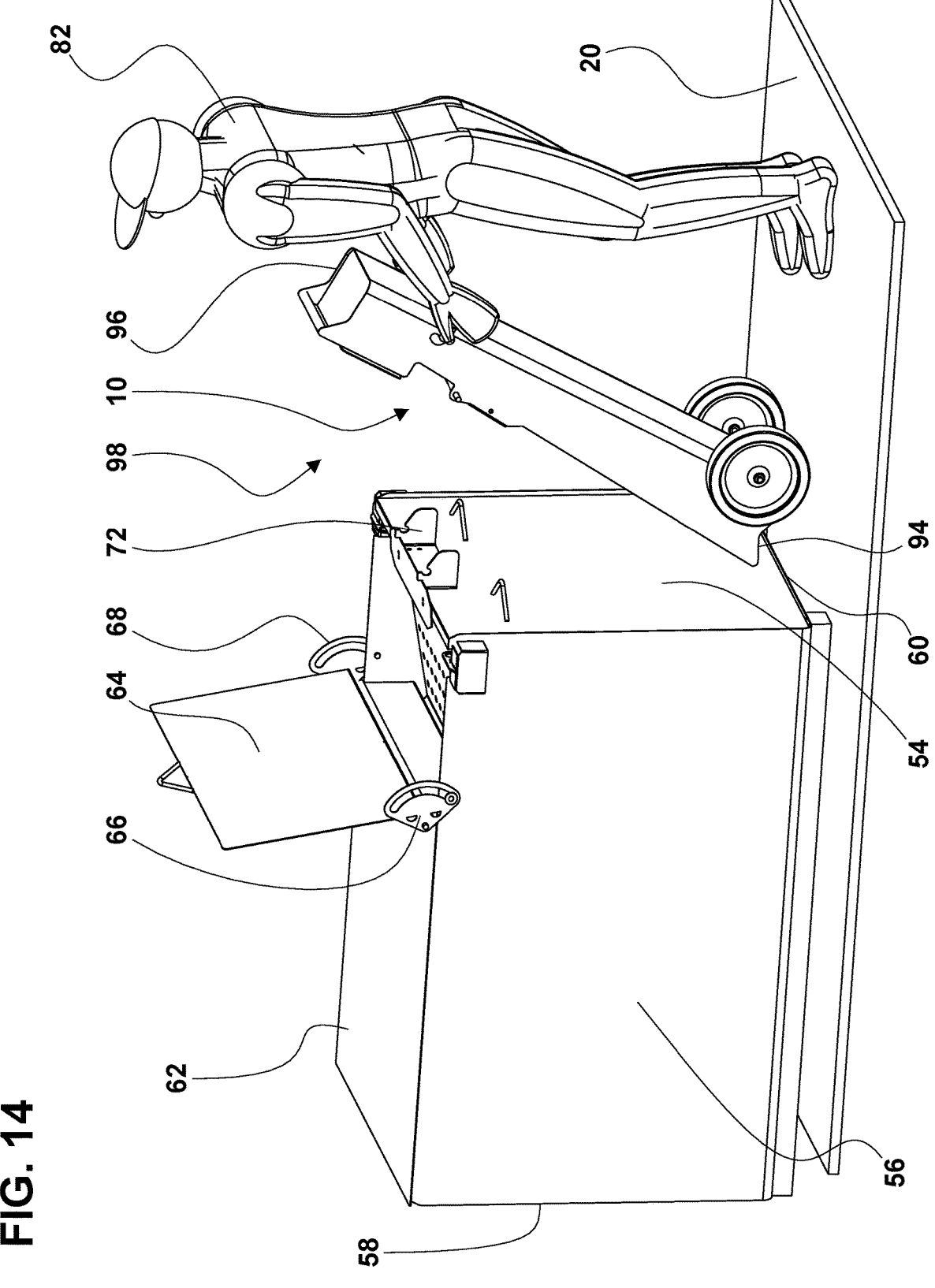
FIG. 14 is an alternative front view of a combination liquid holding device and liquid receptacle 100 in the preferred embodiment. This figure illustrates how a user 82 may align the liquid holding device 10 with a liquid receptacle 50 in order to attach it at the receptacle bracket 74.
Figure 15:
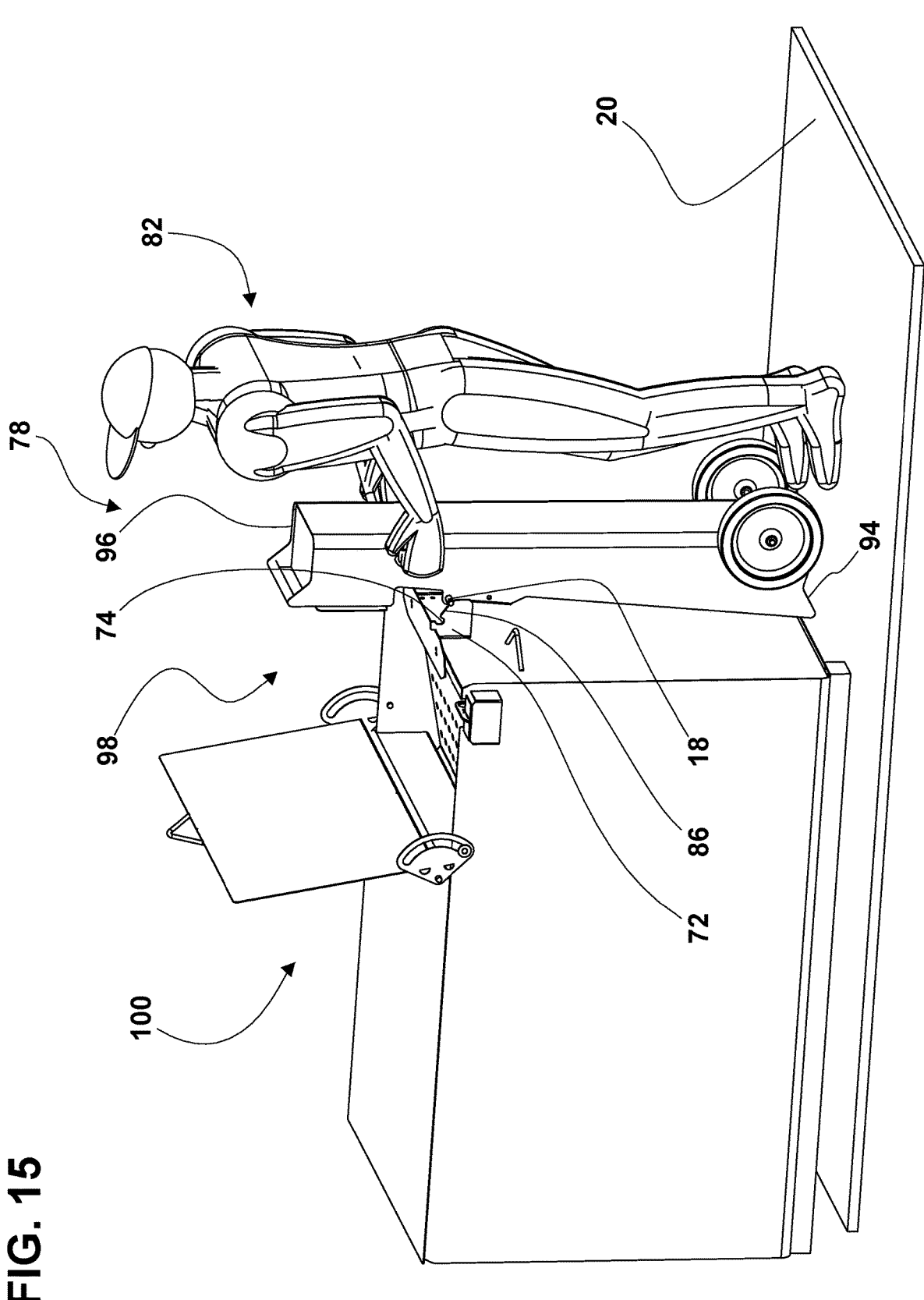
FIG. 15 is an alternative front view of a combination liquid holding device and liquid receptacle 100 in the preferred embodiment. Here, the user 82 may have moved the liquid holding device 10 from the inclined, ready-to-roll position 140 the stationary upright position 98. The axial ends of the attachment bar 18 may be aligned with the ramp sections 86 of the receptacle bracket 72 so that the attachment bar 18 may ride the ramp sections 86 into the mounting slot 74 (refer to FIG. 7).
Figure 16:
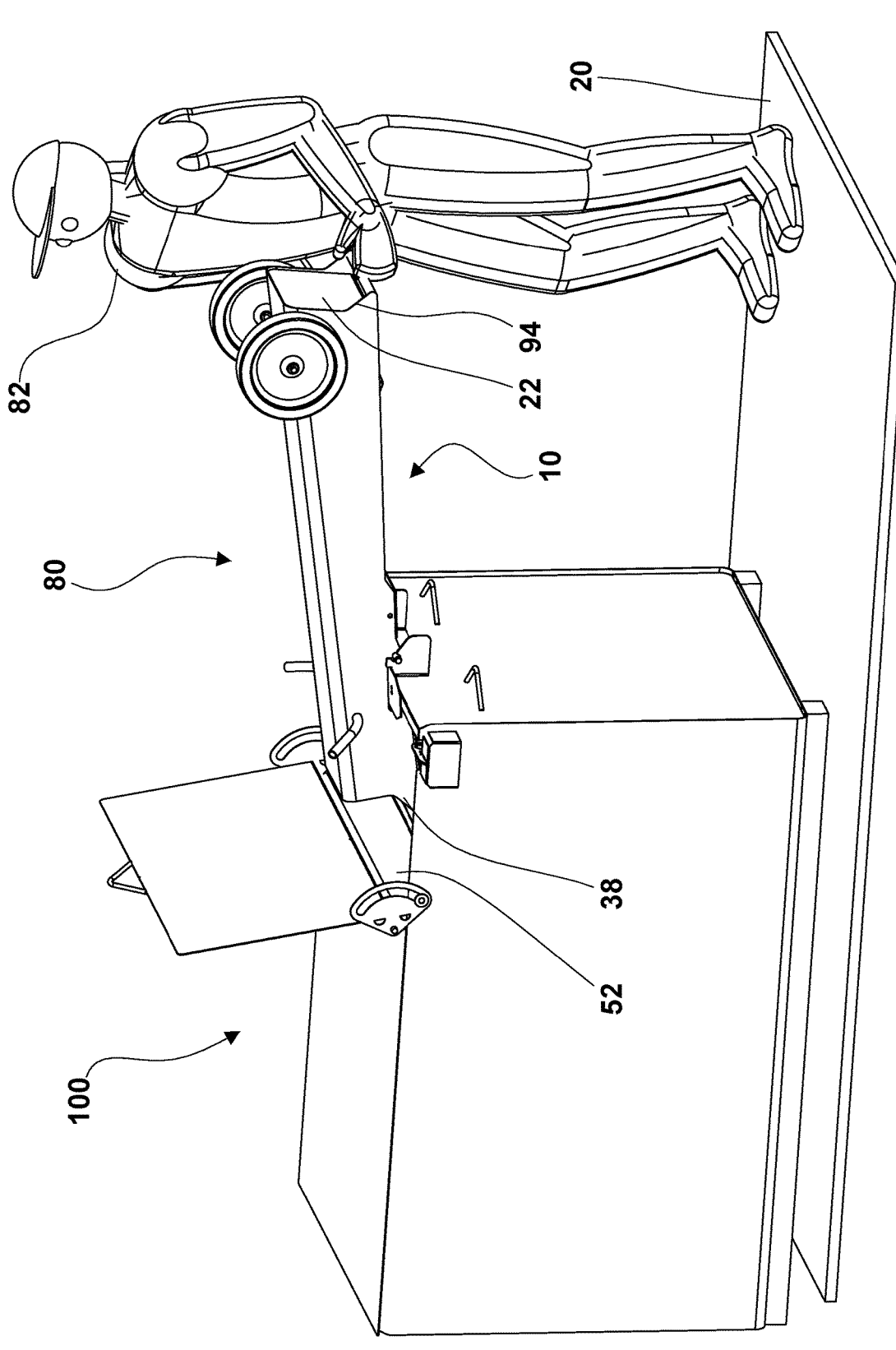
FIG. 16 is an alternative front view of a combination liquid holding device and liquid receptacle 100 in the preferred embodiment. Here, the user 82 may have rotated the liquid holding device 10 from the first vertical position 78 to the second horizontal position 80. User 82 may grasp the liquid holding device 10 by the base 22 in order to provide leverage and assist the user in lifting the liquid holding device 10. The collar 38 may partially enter the receptacle opening 52 so that liquid may flow from the tank 12.
Figure 17:
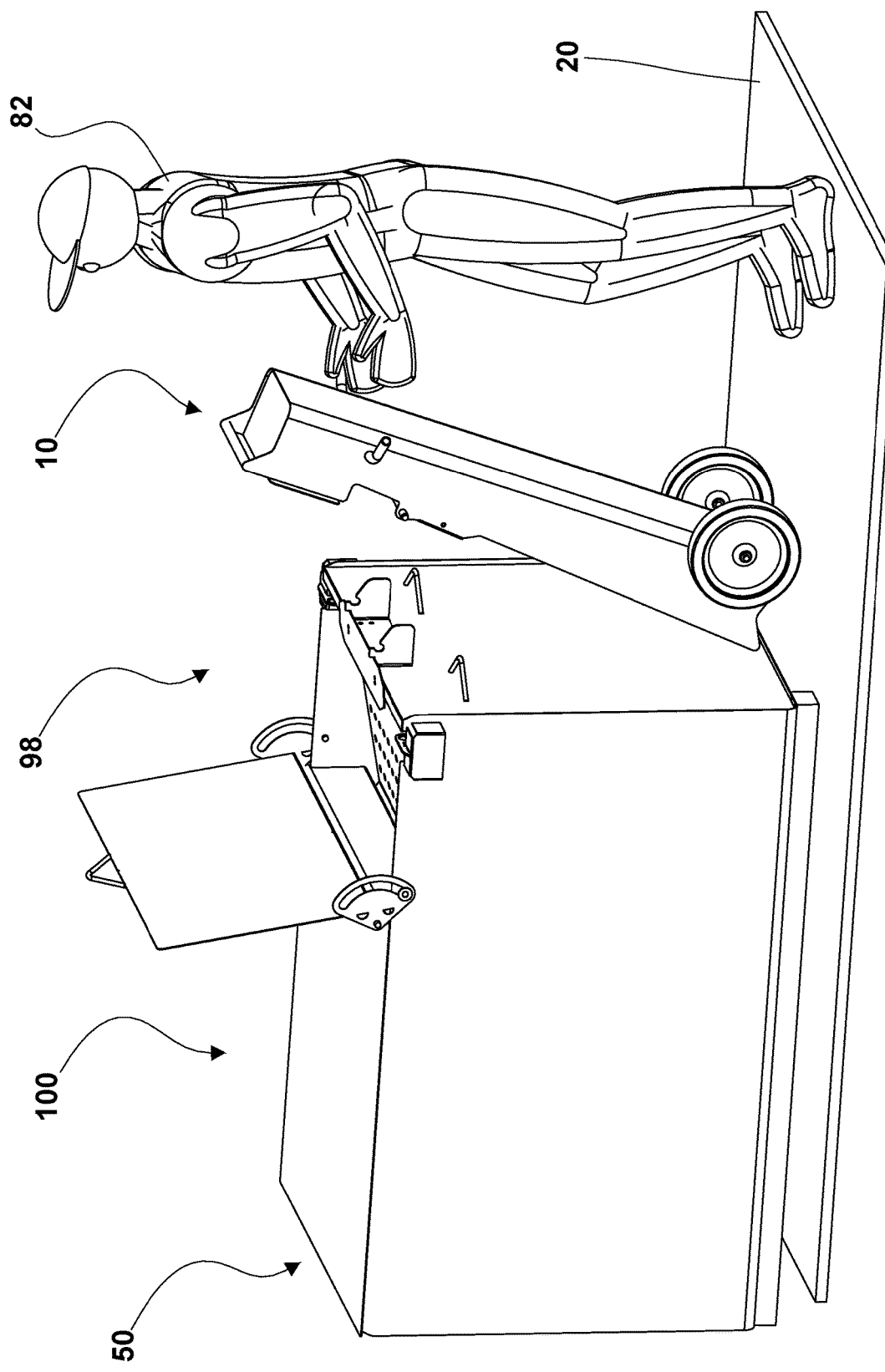
FIG. 17 is an alternative front view of a combination liquid holding device and liquid receptacle 100 in the preferred embodiment. The user 82 may have disengaged the liquid holding device 10 from the liquid receptacle 50. The user 82 may then roll the liquid holding device 10 away from the liquid receptacle 50.
Figure 18:
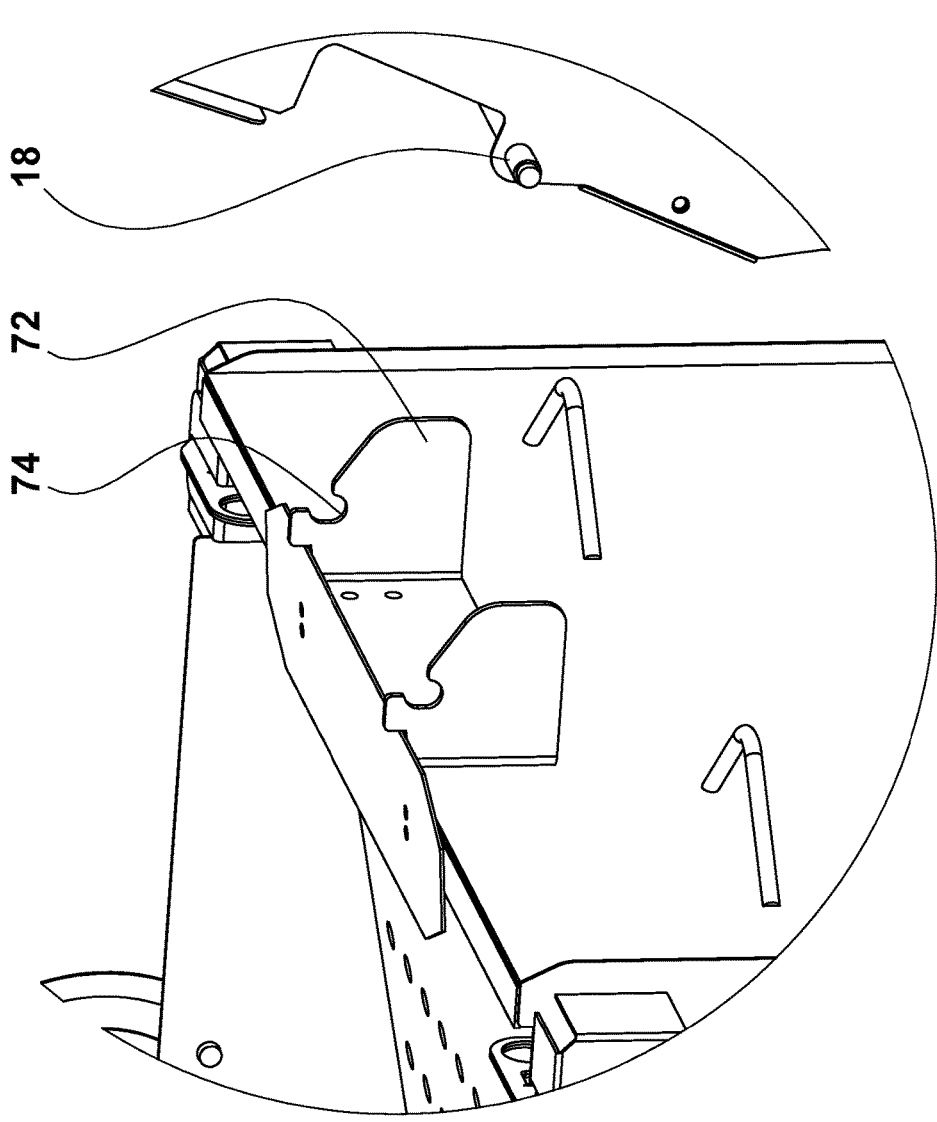
FIG. 18 is a close-up, perspective view of the combination liquid holding device and liquid receptacle 100 of FIG. 17. This figure may illustrate the structure of the receptacle brackets 72 when there is no attachment bar 18 located within the mounting slots 74.
Figure 19:
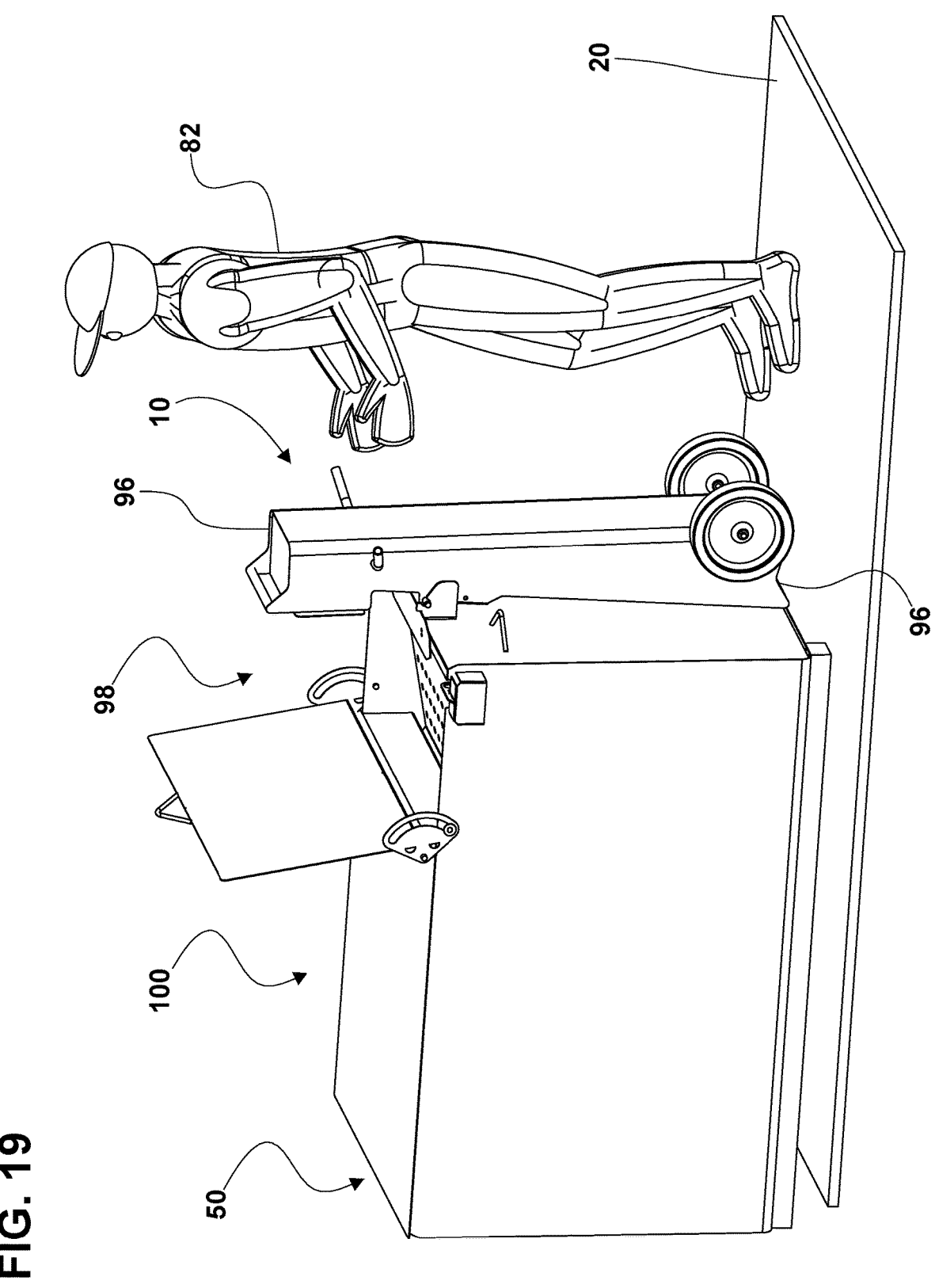
FIG. 19 is an alternative front view of a combination liquid holding device and liquid receptacle 100 in the preferred embodiment. It can be seen that when the liquid holding device 10 is engaged with the liquid receptacle 50, the liquid holding device 10 may be fully supported by the liquid receptacle 50 and the user 82 may step away or otherwise let go of the device without the device failing.
Figure 20:
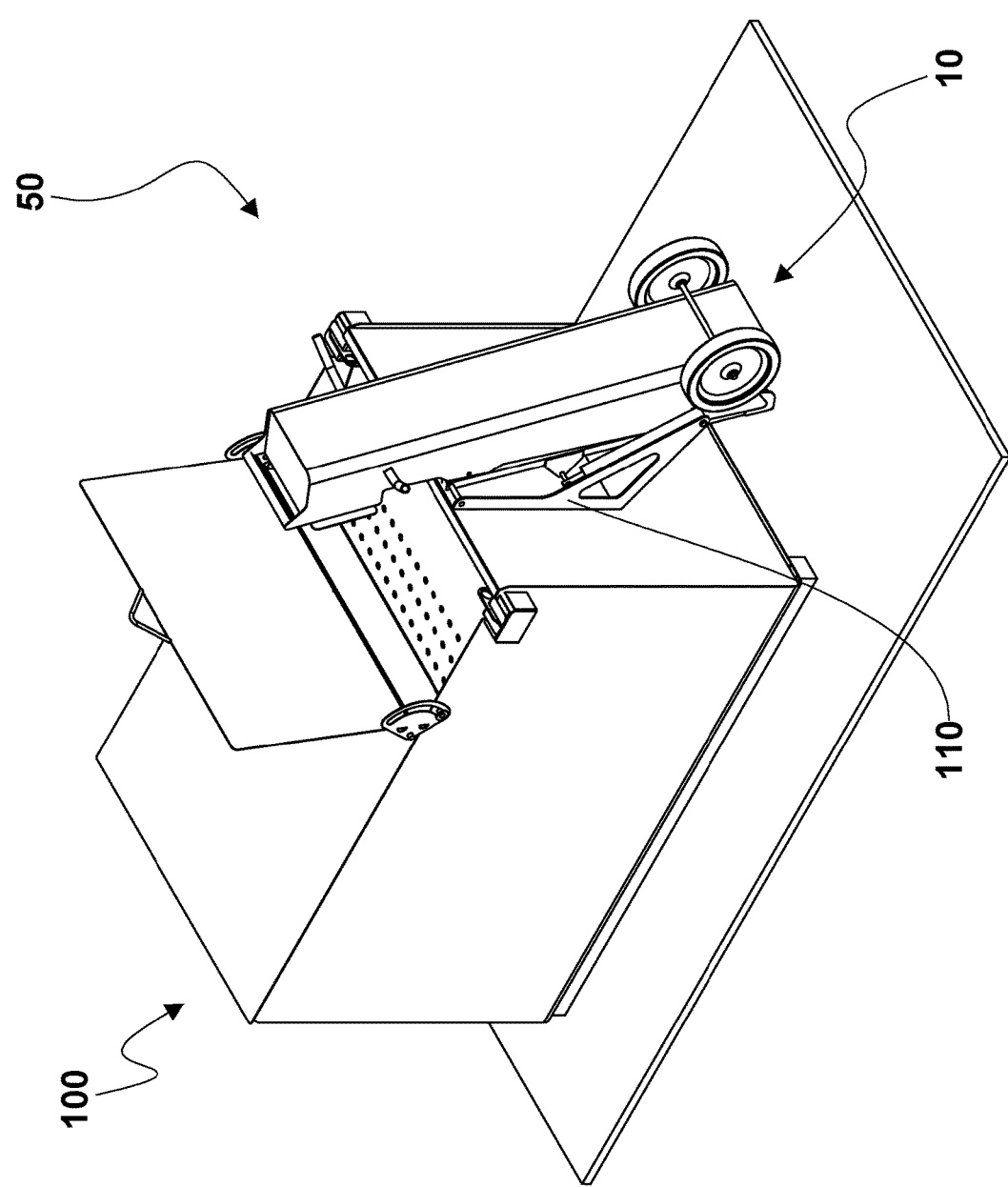
FIG. 20 is a front perspective view of a combination liquid holding device and liquid receptacle 100 in the alternative preferred embodiment. The combination 100 may comprise a tank lift device 110 attached to the liquid receptacle 50.

Referring now to FIGS. 11 and 12, the liquid holding device 10 may be seen in the second, horizontal position 80. In the second, horizontal position 80, the liquid holding device 10 may be said to be generally parallel to the supporting surface 20. "Generally parallel to the supporting surface 20" preferably means that the back 28 of the liquid holding device 10 forms at most a forty-five-degree (45°) angle with the supporting surface 20. More preferably, "generally perpendicular to the supporting surface 20" means that the back 28 of the liquid holding device 10 forms at most a thirty-degree (30°) angle with the supporting surface 20. More preferably still, "generally perpendicular to the supporting surface 20" means that the back 28 of the liquid holding device 10 forms at most a ten-degree (10°) angle with the supporting surface 20. Most preferably, "generally perpendicular to the supporting surface 20" means that the back 28 of the liquid holding device 10 forms a zero-degree (0°) angle with the supporting surface 20.

As can best be seen in FIG. 12, the tank opening 16 may be above and closely aligned with the receptacle opening 52 when the liquid holding device 10 is in the second, horizontal position 80. The tank opening 10 being above and closely aligned with the receptacle opening 52 may allow for and facilitate the flowing of liquid from the tank chamber 48 via the tank opening 16 through the receptacle opening 52 and into the receptacle chamber 76. "Closely aligned" preferably means that for an arbitrary axis drawn perpendicular to the supporting surface 20 through the geometric center of the receptacle opening 52, the geometric center of the tank opening 16 is within one foot (1') of the arbitrary axis. More preferably, "closely aligned" means that for an arbitrary axis drawn perpendicular to the supporting surface 20 through the geometric center of the receptacle opening 52, the geometric center of the tank opening 16 is within six inches (6") of the arbitrary axis. More preferably still, "closely aligned" means that for an arbitrary axis drawn perpendicular to the supporting surface 20 through the geometric center of the receptacle opening 52, the geometric center of the tank opening 16 is within three inches (3") of the arbitrary axis. Most preferably, "closely aligned" means that for an arbitrary axis drawn perpendicular to the supporting surface 20 through the geometric center of the receptacle opening 52, the geometric center of the tank opening 16 lies along the arbitrary axis.

Referring still to FIGS. 11 and 12, the sidewall 37 forming the collar 38 around the tank opening 16 may extend into the receptacle opening 52. This may help to further eliminate the possibility of excess liquid and other waste materials from splashing outwardly during the dumping.

Referring generally now to FIGS. 13-19, a user 82 of the combination 100 may be seen. The user 82 may place the tank opening 16 of the liquid holding device 10 underneath a spout or other drainage valve in a kitchen device in order to drain the waste liquid, or oil, into the tank 12. The user 82 may then grasp the liquid holding device 10 by the grip 35 or the handles 36, and lift the liquid holding device 10 into an inclined, ready-to-roll position 140. The user 82 may then roll the liquid holding device 10 on the plurality of wheels 32, 34. Once the liquid holding device 10 is aligned with the liquid receptacle 50, the user 82 may stand the liquid holding device 10 in a stationary upright position 98. From here, the user 82 may push the top half of the liquid holding device 10 such that the axial ends of the attachment bar 18 slide or roll up the ramp sections 86 of the receptacle bracket 72. Once the attachment bar 18 has reached a predetermined point along the ramp section 86, the attachment bar 18 may drop into the mounting slot 74. With the attachment bar 18 in the mounting slot 74, the liquid holding device 10 may now be connected to the receptacle 50.

Referring still to FIGS. 13-19, the user 82 may lift and rotate the liquid holding device 10 about the axis of rotation A which lies along the axial centers of the attachment bar 18 and the mounting slot 74. Once the liquid holding device 10 is in the second, horizontal position 80, the liquid contained in the tank chamber 48 may freely flow into the liquid receptacle 50. Here, the liquid may remain in the receptacle chamber 76 until being later emptied by waste disposal company or other waste disposal service. The user 82 may then rotate the liquid holding device back to the first, vertical position 78, and by lifting slightly, the user 82 may disengage the attachment bar 18 from the mounting slot 74. The combination 100 may then return to its two primary and succinct elements: the liquid holding device 10 and the liquid receptacle 50.

Referring now generally to FIGS. 20-30, the combination liquid holding device and liquid receptacle 100 may be seen in an alternative preferred embodiment. Here, a tank lift device 110 may be substituted for the receptacle bracket 72 on the front side 54 of the liquid receptacle 50.

Figure 21:
FIG. 21 is a side view of a liquid receptacle 50 in the alternative preferred embodiment. The liquid receptacle 50 may comprise a tank lift device 110. The tank lift device 110 may comprise a backrest plate 118 configured to contact a front 26 of a liquid holding device 10. The backrest plate 118 may have a first backrest plate axial end 120 and a second backrest plate axial end 122. The tank lift device 110 may further comprise a tank lift bracket 124 configured to attach to the liquid receptacle 50. The tank lift device 110 may also comprise a piston 126. The piston may comprise a first piston end 128 and a second piston end 130. The first piston end 128 may attach to the tank lift bracket 124. The second piston end 130 may be configured to attach to the backrest plate 118 at a point between the first backrest plate axial end 120 and the second backrest plate axial end 122.
Figure 22:
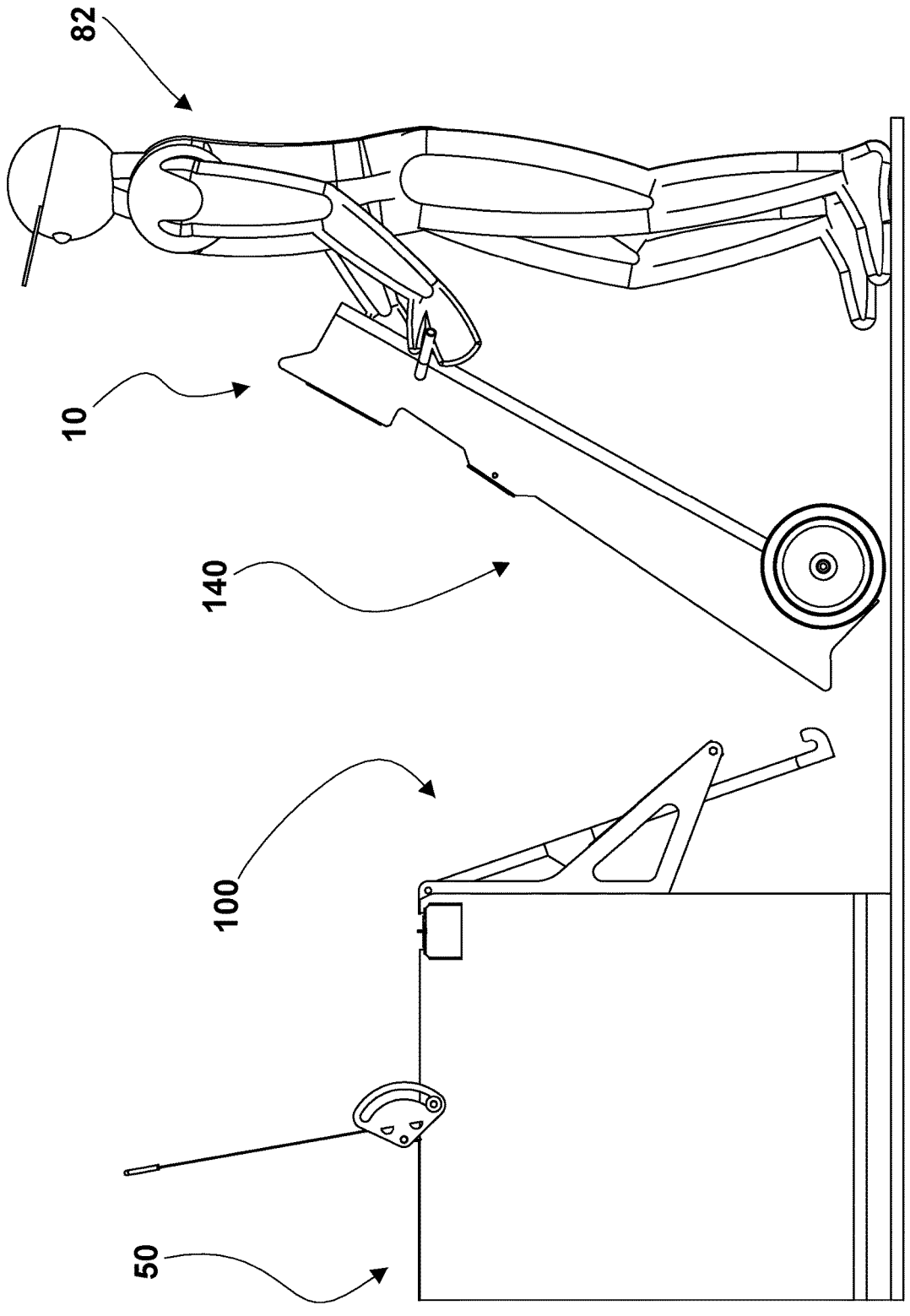
FIG. 22 is a side view of a combination liquid holding device and liquid receptacle 100 in the alternative preferred embodiment. Here, the user 82 can be seen rolling the liquid holding 10 in the inclined, ready-to-roll position 140. The user 82 may also be preparing to mount the liquid holding device 10 onto the liquid receptacle 50.
Figure 23:
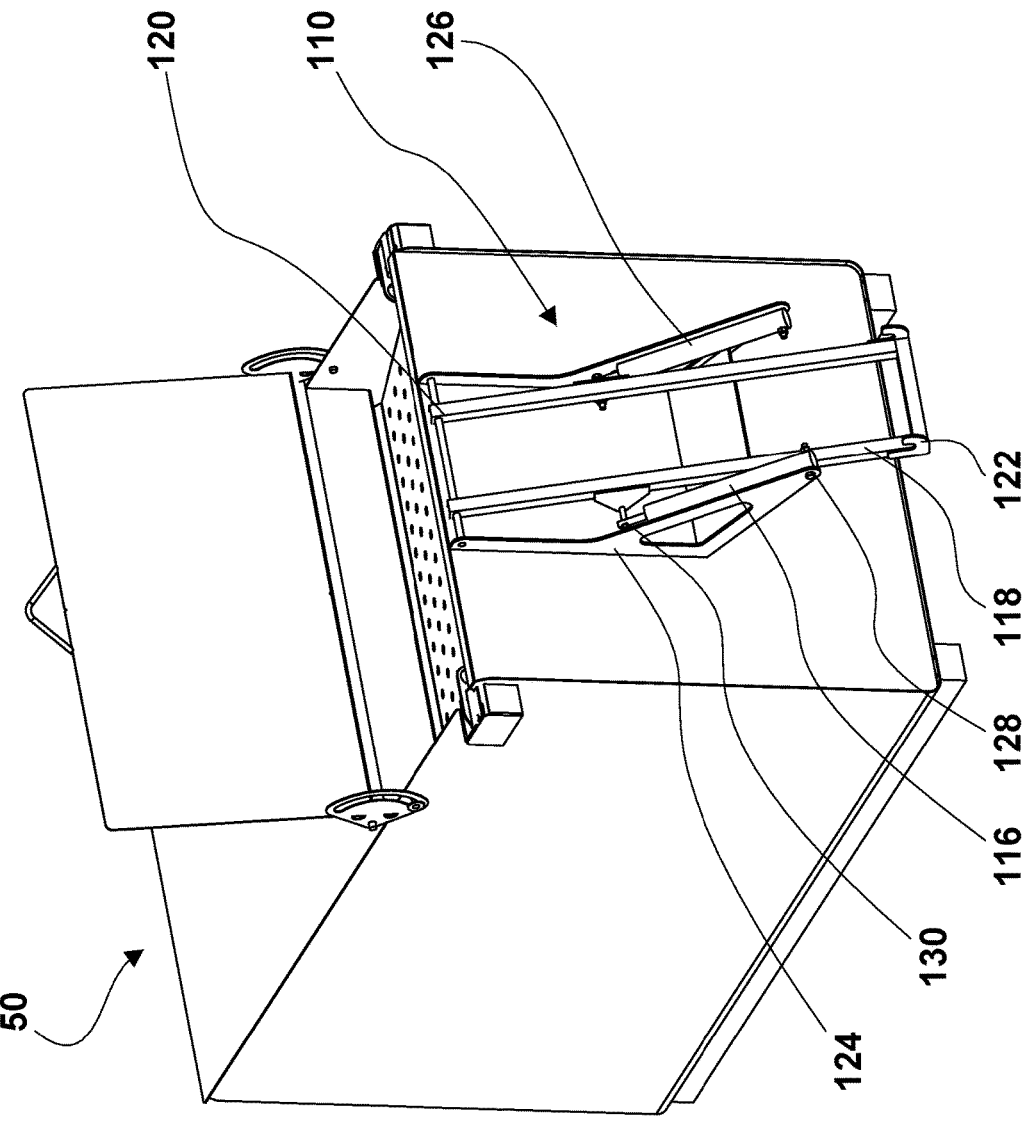
FIG. 23 is a front perspective view of a liquid receptacle 50 in the alternative preferred embodiment. Here, the structure of the tank lift device 110 can be more easily seen. The tank lift device 110 may be substituted for the receptacle bracket 72 of the preferred embodiment.

Referring specifically to FIG. 21, the various elements of the tank lift device 110 may be seen. The tank lift device 110 may comprise a lift drive 116. In the preferred embodiment, the lift drive 116 comprises a piston 126. One of ordinary skill in the art would appreciate from this disclosure that the lift drive 116 may be any suitable mechanical device for providing a lift assist such as, but not limited to a gas spring, a compression spring, a piston, a pulley, an elevator, or a motorized actuator, without departing from the scope of the present invention. The tank lift device 110 may further comprise a backrest plate 118. The backrest plate 118 may be configured to contact a portion of the front 26 of the liquid holding device 10. The backrest plate 118 may have a first backrest plate axial end 120 and a second backrest plate axial end 122. The first backrest plate axial end 120 may be configured to attach to the liquid receptacle 50 and form the axis of rotation A. The tank lift device 110 may further comprise a tank lift bracket 124. The tank lift bracket 124 may be configured to attach to a front side 54 of the liquid receptacle 50. The purpose of the tank lift bracket 124 may be to strengthen and support the tank lift device 110. Further, the piston 126 may comprise a first piston end 128 and a second piston end 130. The first piston end 128 may be configured to attach to the tank lift bracket 124. The second piston end 130 may be configured to attach to the backrest plate 118.

Figure 24:
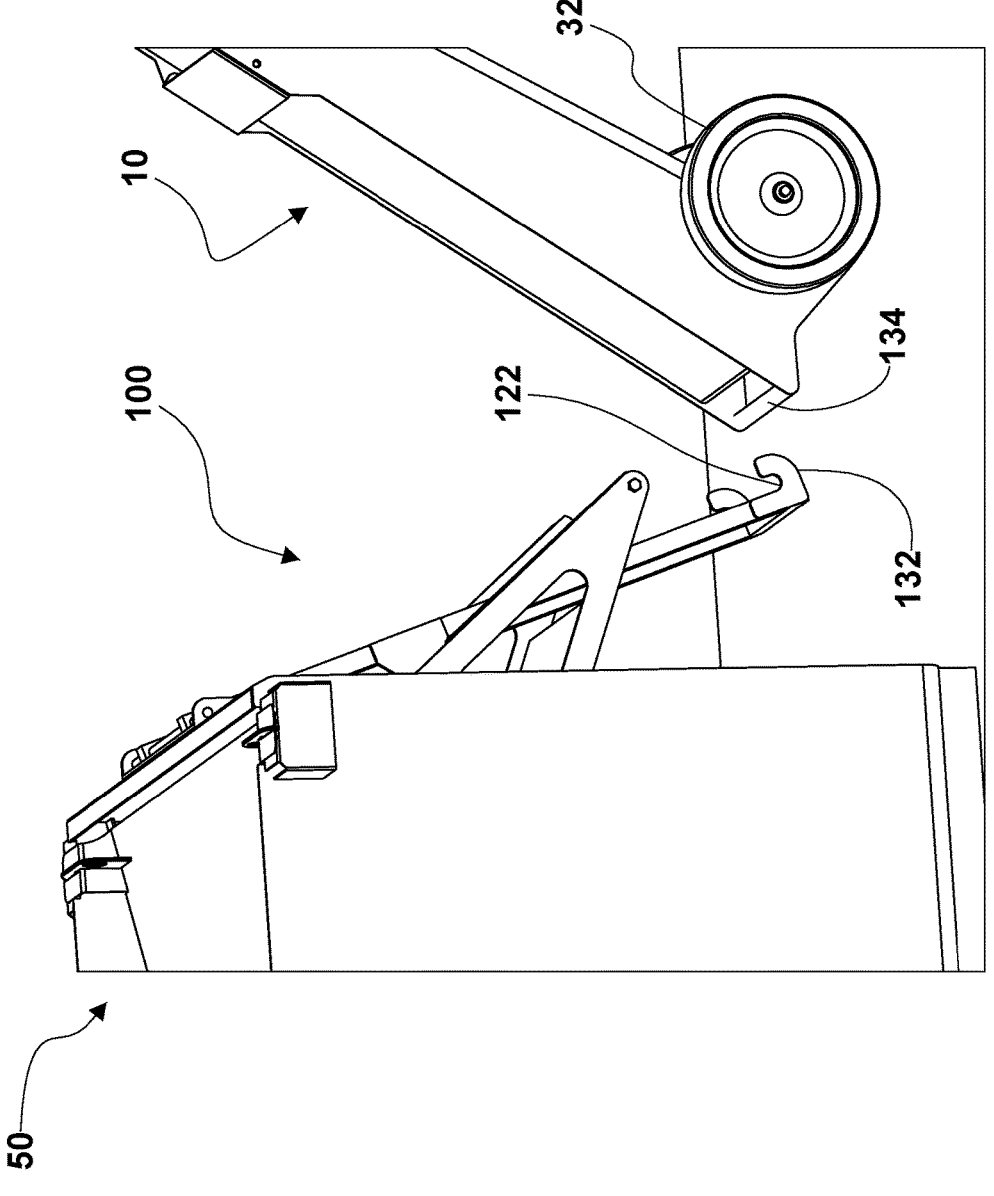
FIG. 24 is a side perspective view of a combination liquid holding device and liquid receptacle 100 in the alternative preferred embodiment. Here, the tank lift device 110 may comprise a first coupling mechanism 132. The liquid holding device 10 may comprise a second coupling mechanism 134. The second coupling mechanism 134 may be configured to detachably engage with the first coupling mechanism 132. In this way, the liquid holding device 10 may be detachably connected to the liquid receptacle 50 in order to be lifted and rotated by the tank lift device 110.
Figure 25:
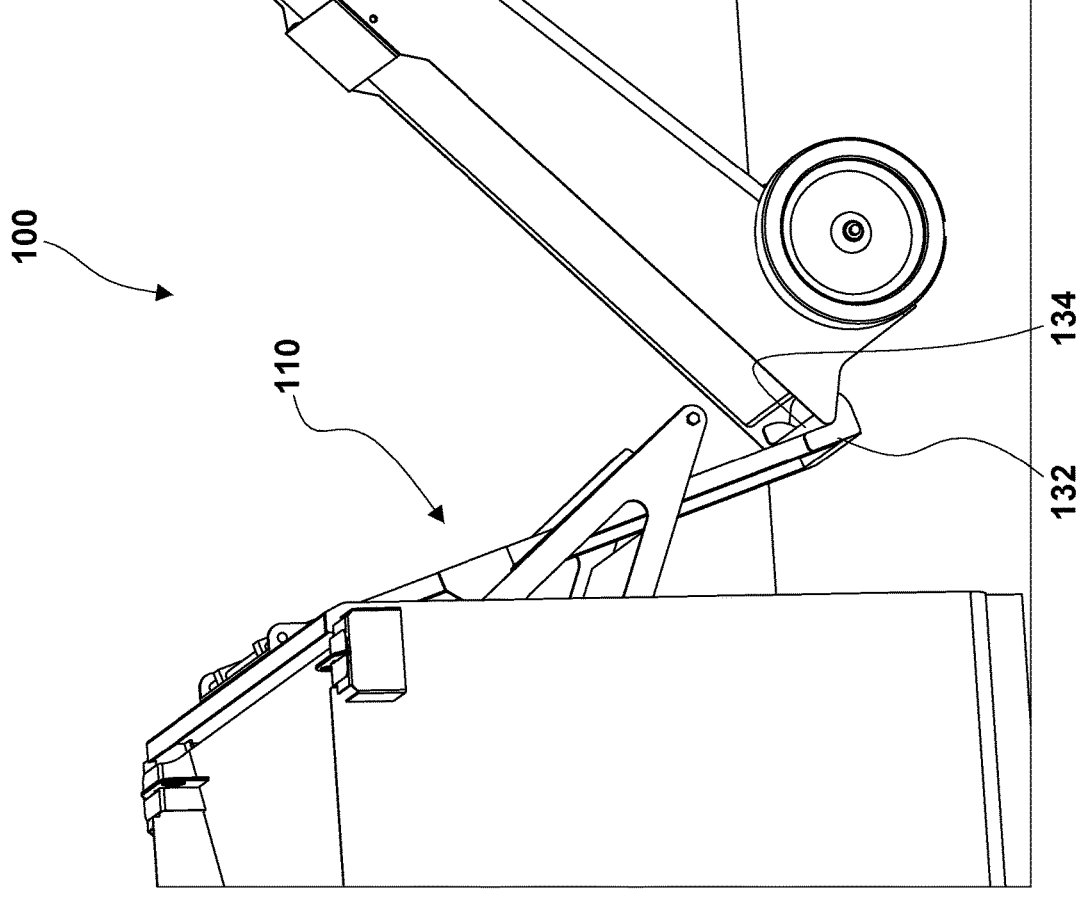
FIG. 25 is a side perspective view of a combination liquid holding device and liquid receptacle 100 in the alternative preferred embodiment. Here, the tank lift device 110 may comprise a first coupling mechanism 132. The liquid holding device 10 may comprise a second coupling mechanism 134. The second coupling mechanism 134 may be detachably engaged with the first coupling mechanism 132 before the tank lift device 110 may be operated.
Figure 26:
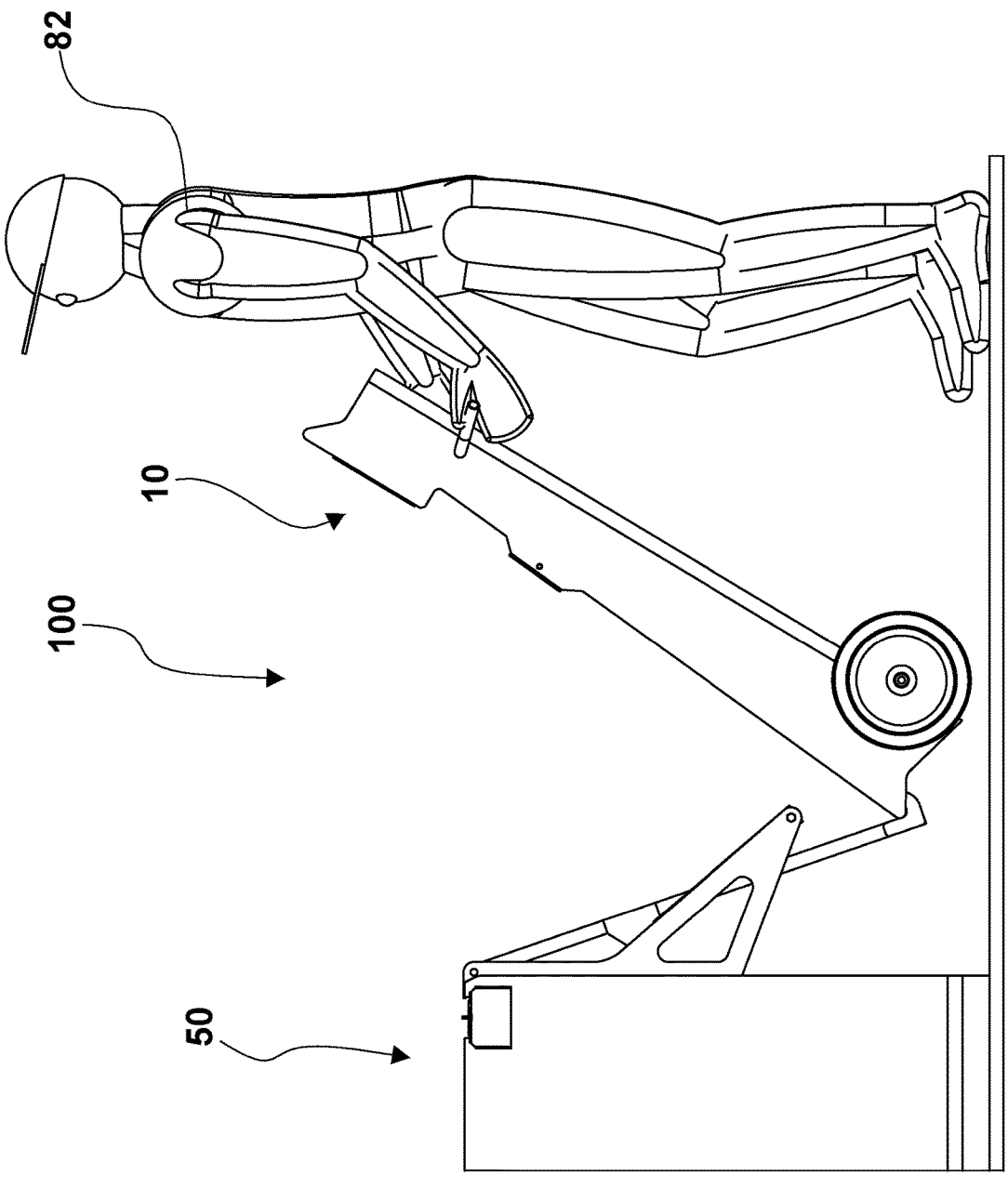
FIG. 26 is a side view of a combination liquid holding device and liquid receptacle 100 in the alternative preferred embodiment. Here, the liquid holding device 10 may be engaged with the liquid receptacle 50 by the user 82. The liquid holding device 10 may now be moved by the user to first vertical position 78 or disengaged with the liquid receptacle 50.

Referring specifically now to FIG. 24, the combination 100 may be seen before the liquid holding device 10 and the liquid receptacle 50 have been connected. The second backrest plate axial end 122 may form a first coupling mechanism 132. A second coupling mechanism 134 may be formed in the base 122 of the liquid holding device 10 on an opposite side from the plurality of wheels 32, 34. In order to detachably connect the liquid holding device 10 and the liquid receptacle 50 in the presence of the tank lift device 110, the first coupling mechanism 132 and the second coupling mechanism 134 may form the connection for the combination 100.

Figure 27:
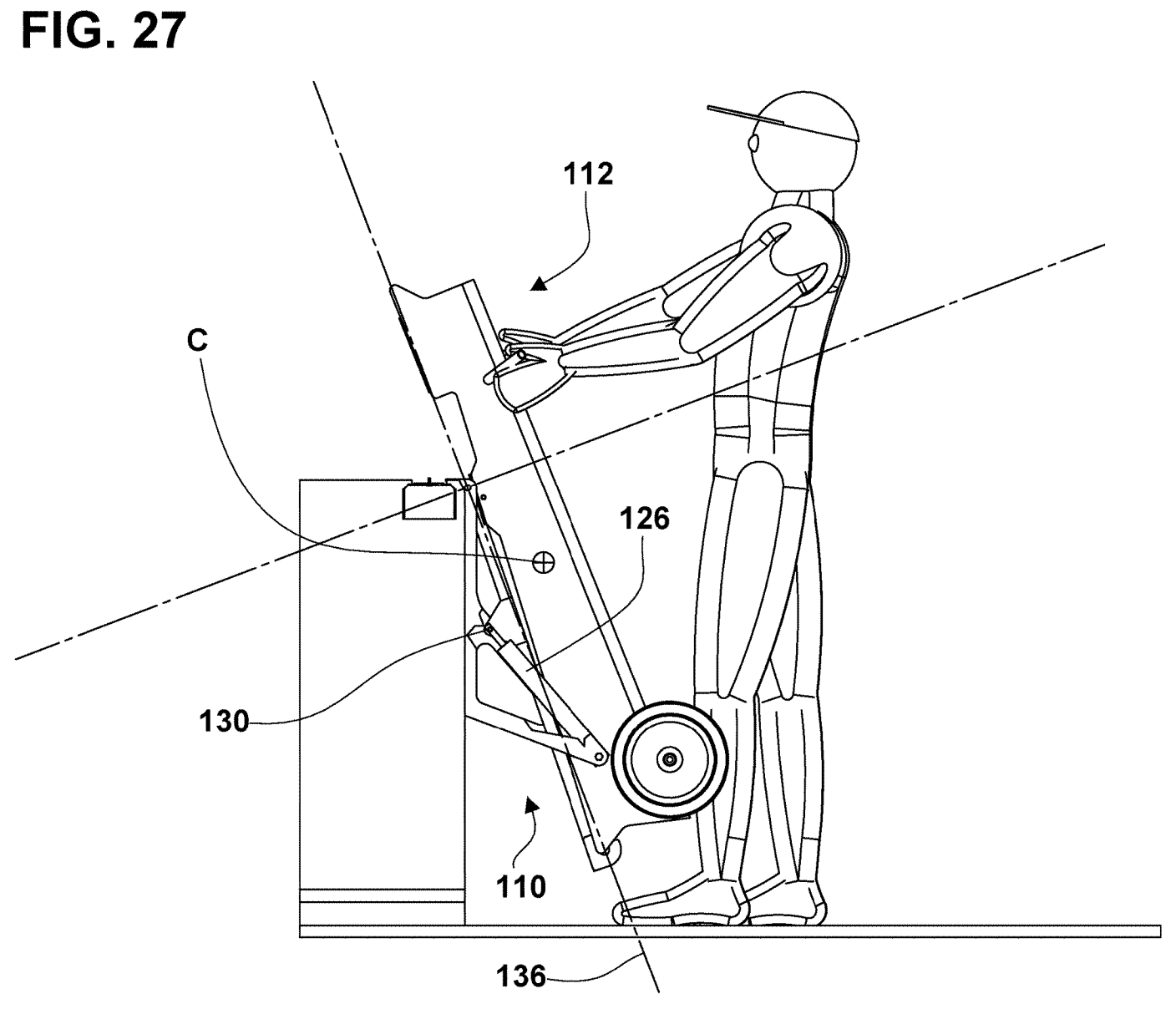

Referring specifically now to FIG. 27, the tank lift device 110 may be seen in use. The piston 126 be biased for pushing outwardly and extending axially. Therefore, when the liquid holding device 10 may be first connected to the liquid receptacle 50, the piston 126 may bias the tank lift device 110 toward a first, non-pour position 112. However, when the piston end 130 may pass a predetermined point 136, the piston 126 may bias the tank lift device 110 toward a second, pour position 114. In this way, the tank opening 16 may be above and closely aligned with the receptacle opening 52. This in turn may allow for the dumping of liquid, waste oil, and other waste materials from the liquid holding device 10 into the liquid receptacle 50.

The liquid holding device 10 may also have a center of gravity C. An arbitrary plane may be drawn perpendicular to the support surface 20, parallel to the front side 54, and through the first piston end 128. When the center of gravity C may be on the side of the arbitrary plane closer to the liquid receptacle 50, the liquid holding device 10 may be held in place by gravity in the first, non-pour position 112. However, when the center of gravity C may be on the side of the arbitrary plane further from the liquid receptacle 50, the liquid holding device 10 may be held in place by gravity out of the first, non-pour position 112, which may allow the user 82 to take advantage of the piston 126 and rotate the liquid holding device 10 to the second, pour position 114.

One of ordinary skill in the art would appreciate from this disclosure that the combination 100, the liquid hand truck, and the liquid dumpster, as well as the various components, especially the tank lift device 110, may be entirely manually powered or spring powered, and free of all motors and electrical components, may be operated by a powered device, may include a motor, or may be operated manually with a powered assist without departing from the scope of the present invention.

Figure 28:
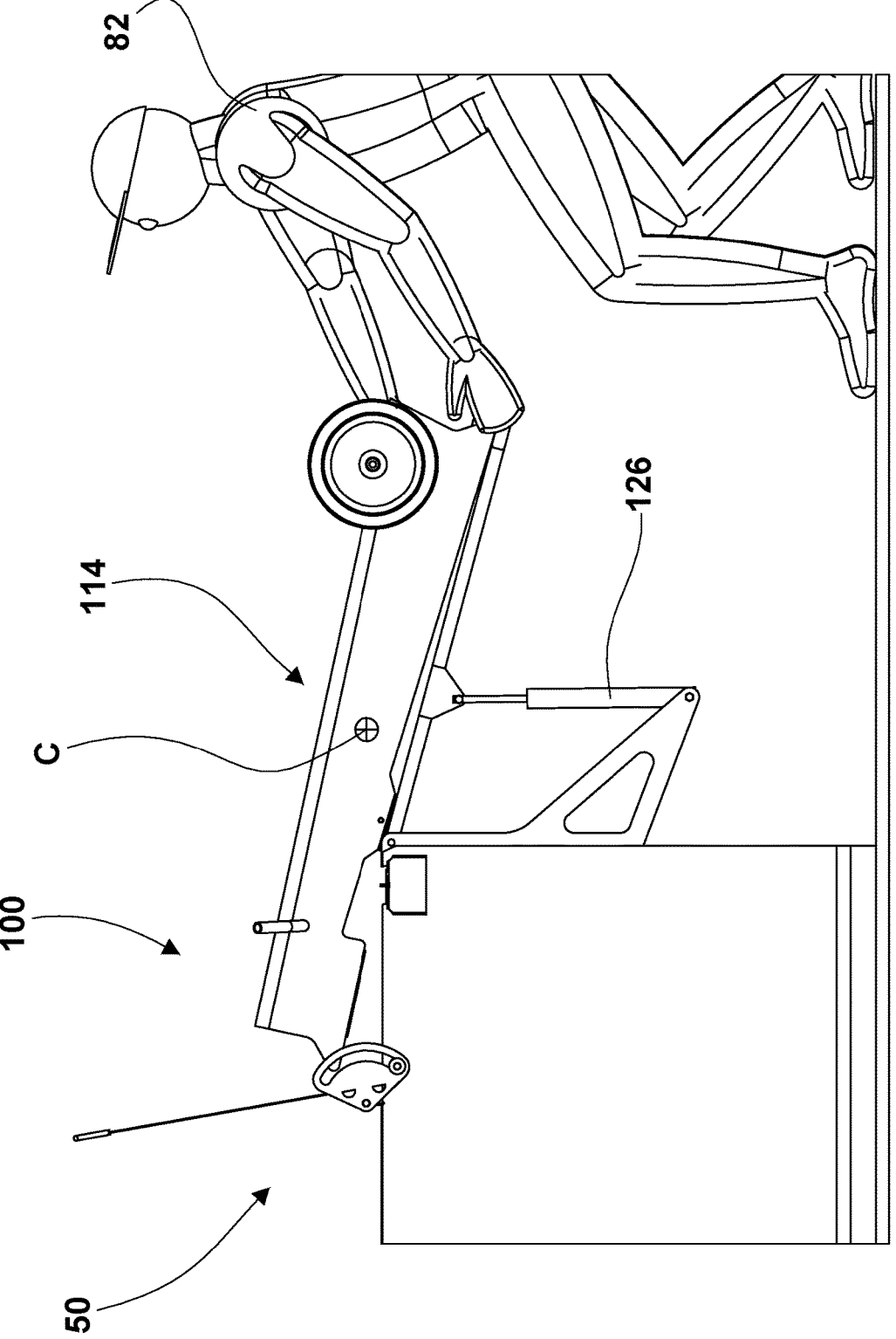
FIG. 28 is a side view of a combination liquid holding device and liquid receptacle 100 in the alternative preferred embodiment. Here, the user 82 may have moved the piston 126 past the predetermined point 136. In this position, the piston 126 may provide lift assistance to the user 82 to continue rotating the liquid holding device 10 about the axis of rotation A and fully into the second horizontal position 80.

Referring specifically now to FIG. 28, it may be seen how a user 82 may engage the tank lift device 110 to assist in dumping the contents of the liquid holding device 10 into the liquid receptacle 50. The amount of work required by the user 82 may be significantly reduced by the lift assist provided by the piston 126. This may have the added benefit of preventing or reducing fatigue and injury to the user 82 by using the combination 100.

Figure 29:
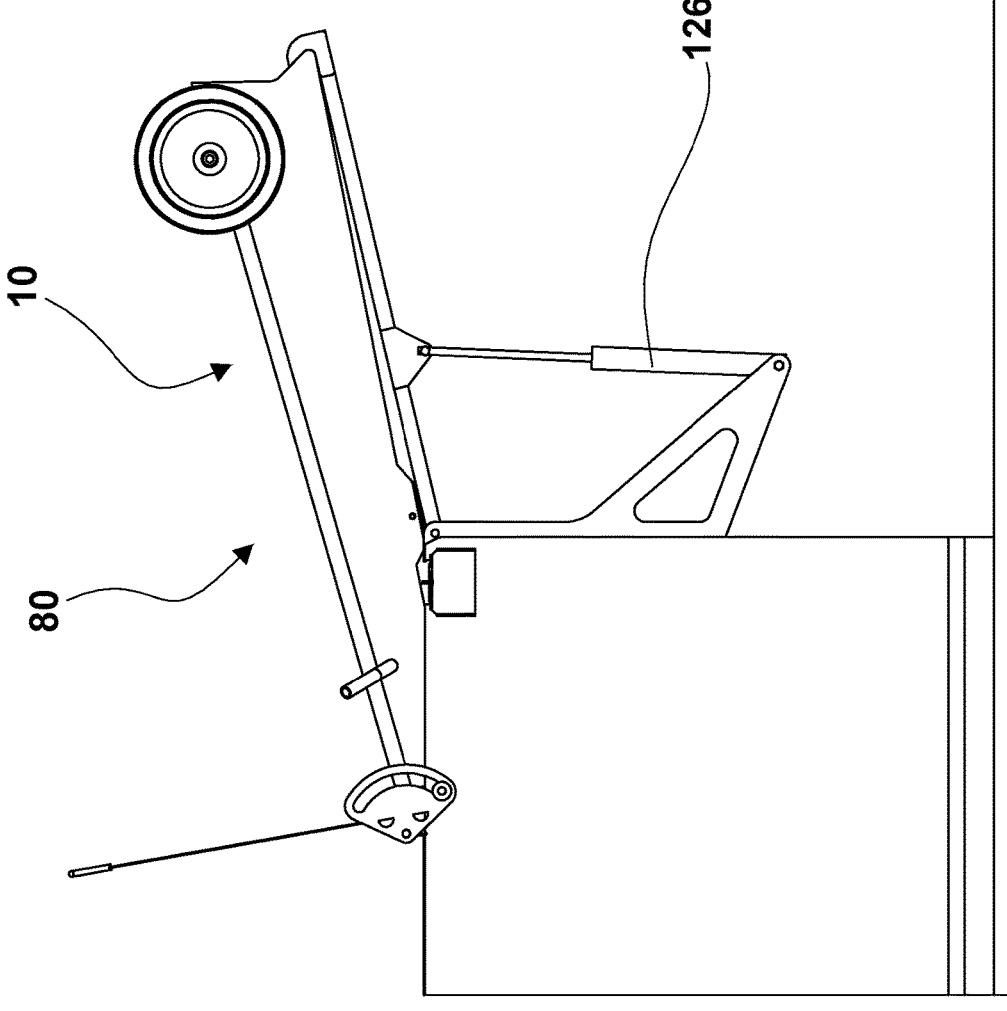
FIG. 29 is a side view of a combination liquid holding device and liquid receptacle 100 in the alternative preferred embodiment. Here, it may be seen that the liquid holding device 10 has been fully rotated into the second horizontal position 80. The piston 126 may be fully extended and support the weight of the liquid holding device 10 without the assistance of the user 82 and may prevent the liquid holding device 10 from rotating back down to the first vertical position 78 due to gravity.
Figure 30:
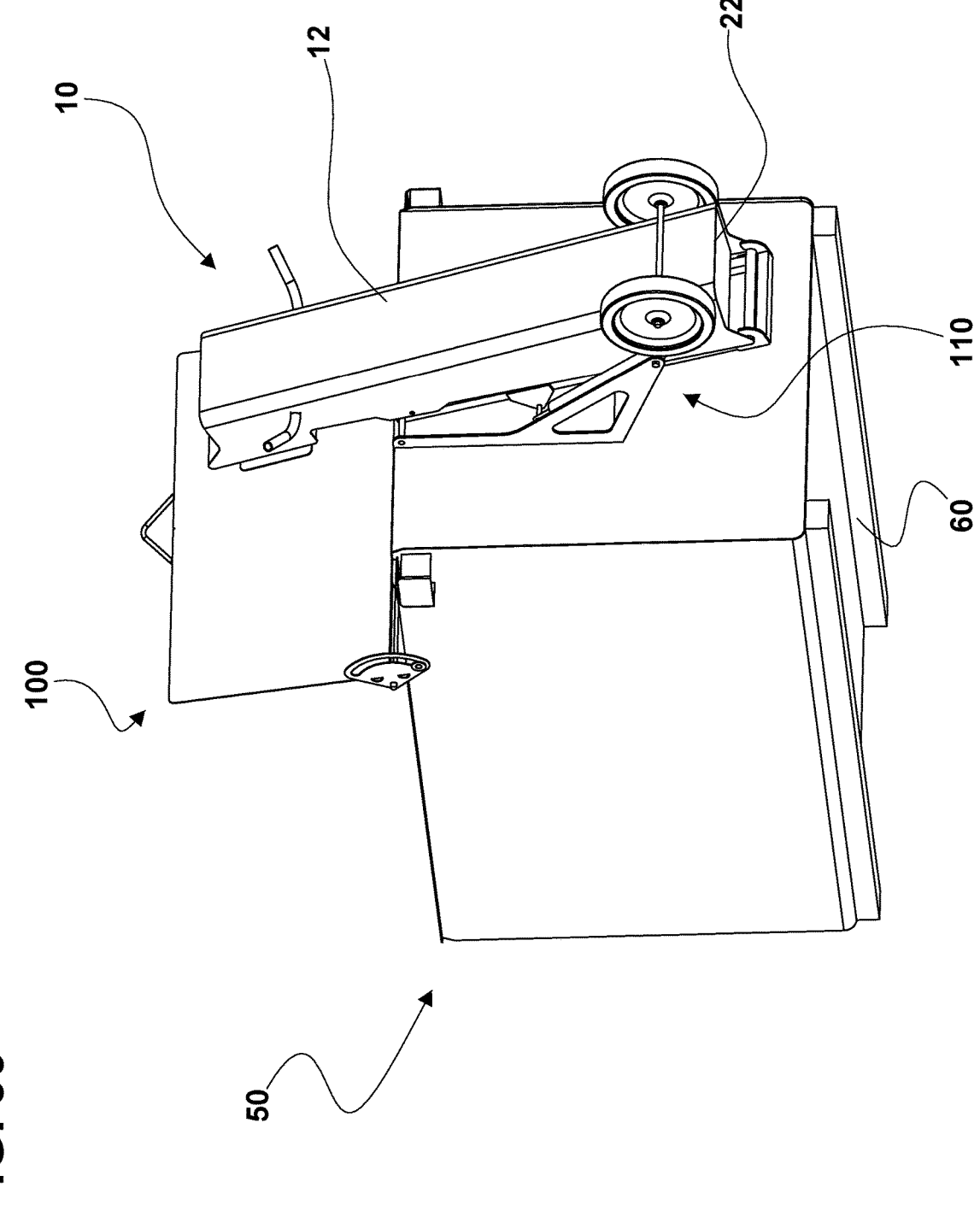
FIG. 30 is a bottom perspective view of a combination liquid holding device and liquid receptacle 100 in the alternative preferred embodiment. This figure shows how the liquid holding device 10 may be fully supported by the tank lift device 110 and held off the supporting surface 20. The base 22 of the tank 12 may be vertically higher than the bottom side 60 of the liquid receptacle 50.
Figure 31:
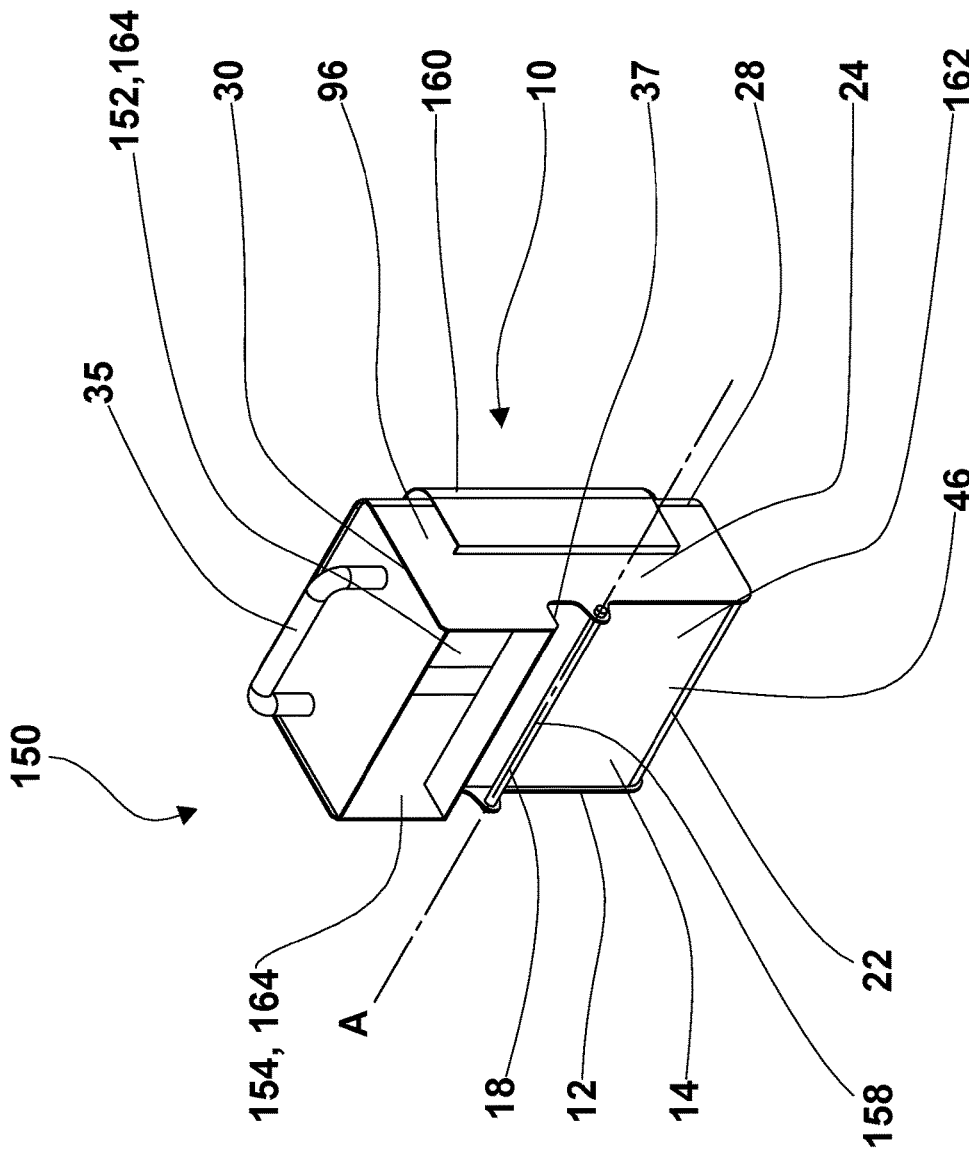
FIG. 31 is a front perspective view of a liquid holding device 10 in the alternative preferred embodiment. The liquid holding device 10 may comprise a bucket 150. The bucket 150 may define a recess or chamber 152 contained therein. The bucket 150 may also comprise a device body 162. The recess or chamber 152 may be in fluid communication with the external environment via an opening 154. The device body 162 may define a body chamber 164 contained therein. The opening 154 may comprise a body opening 166. The opening 154 may face the liquid receptacle 50. A heat shield 160 may be configured to wraparound or partially encapsulate the device body 162.
Figure 32:
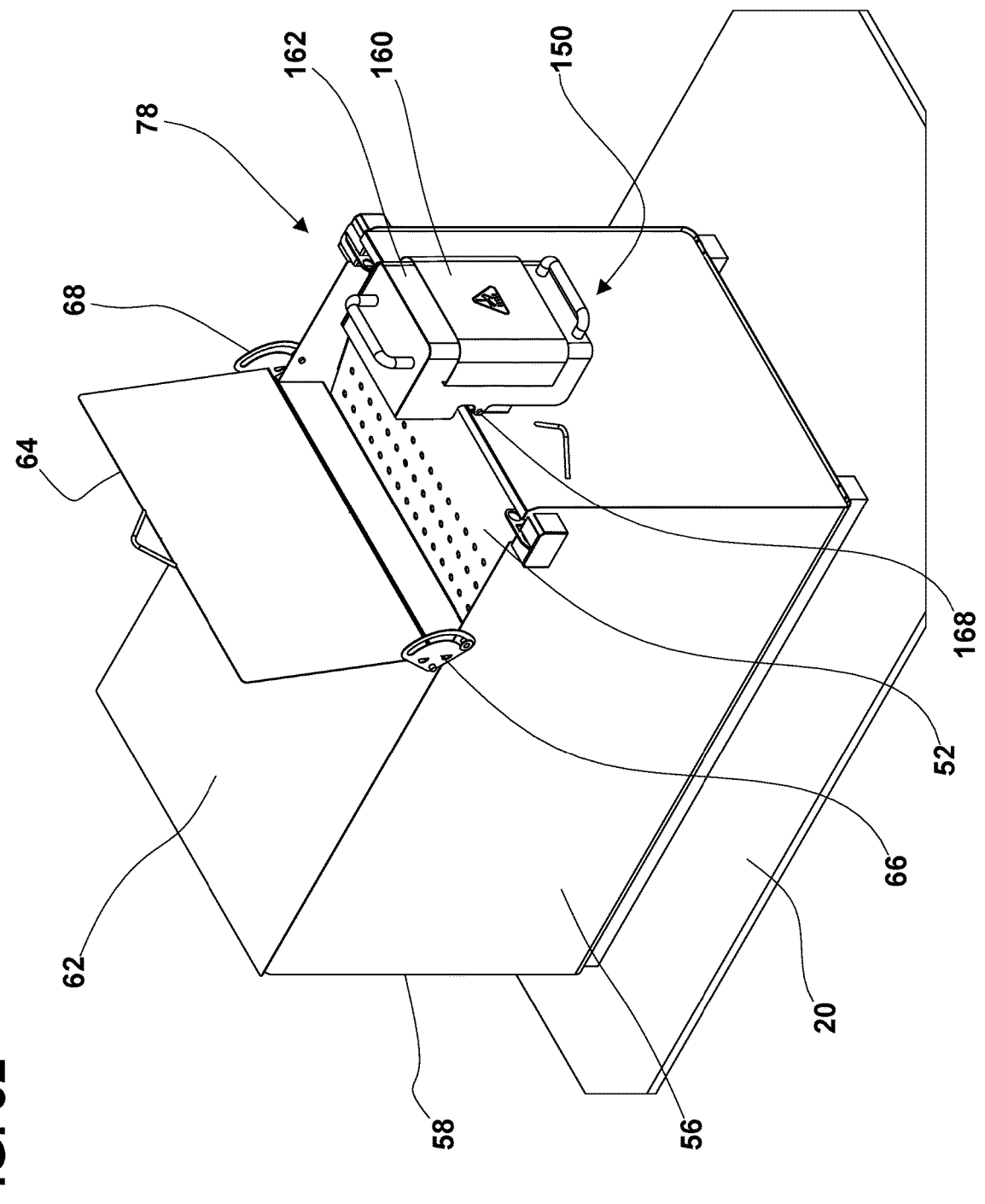
FIG. 32 is a front perspective view of a combination liquid holding device and liquid receptacle 100 in the alternative preferred embodiment. The liquid holding device 10 may comprise a bucket 150. The bucket 150 may define a recess or chamber 152 contained therein. The bucket 150 may also have an opening 154 for liquid to pass through either into or out of the recess 152. The bucket 150 may further comprise a second connector 158 configured to detachably engage with a receptacle connector 156 attached to the liquid receptacle 50. The bucket 150 is shown in a first, non-pour position 112.
Figure 33:
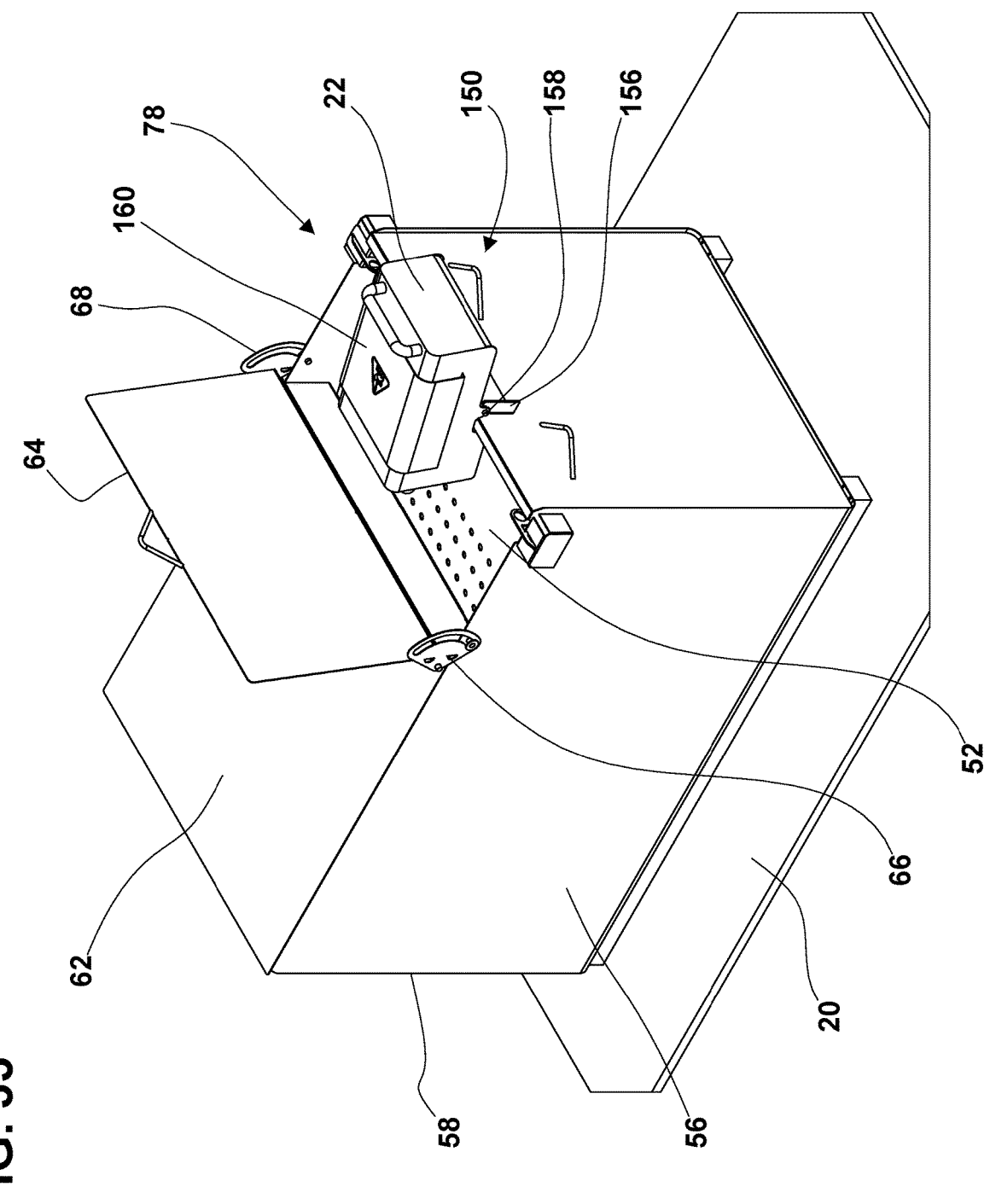
FIG. 33 is a front perspective view of the combination liquid holding device and liquid receptacle 100 in the alternative preferred embodiment. Here, the bucket 150 is shown in a second, pour position 114.

Referring specifically now to FIG. 29, the liquid holding device 10 may, itself, be biased toward the receptacle opening 52 in the second, pour position 114. To prevent, oppose, or restrict the disengagement of the second coupling mechanism 134 from the first coupling mechanism 132, a locking device may be utilized to keep liquid holding device 10 connected to the tank lift device 110. One of ordinary skill in the art would appreciate from this disclosure that the locking device may be located on the coupling mechanisms 132, 134, on an edge shared by the frontside 54 and the topside 62, and/or anywhere else on the tank lift device 110 that does not hinder the rotation of the liquid holding device 10 without departing from the scope of the present invention.

Referring now generally to FIGS. 31-38, the combination liquid holding device/bucket and liquid receptacle may comprise a bucket 150. The liquid holding device 10 may simply be the bucket 150. The bucket 150 may comprise a recess 152 with an opening 154 and the bucket may further have an exterior surface 14 and a base 22. A receptacle connector 156 may be configured to be on either one of (or both) of the bucket 150 and the liquid receptacle 50 to allow the receptacle to positively engage the bucket 150 to allow pivoting therebetween without allowing additional sliding relative motion therebetween during movement of the bucket 150 relative to the receptacle 50. The bucket 150 may include wheels 32, 34 to facilitate moving the liquid holding device 10 in a shopping cart manner. The bucket 150 may include a second connector 158 configured to engage the first connector on the liquid receptacle to create the pivotal connection therebetween. The liquid may be waste oil. FIGS. 31-34 highlight how the bucket 150 may comprise the opening 154 facing the liquid receptacle 50. FIGS. 35-38 highlight how the bucket may comprise the opening 154 facing upward and away The bucket 150 may comprise an exterior surface 14 and be configured to hold liquid and have a base 22. The bucket 150 may define a recess 152 or chamber configured to receive liquid therein. The bucket 150 may define a bucket mouth or opening 154 in fluid communication with the chamber/recess 152. The bucket 150 may also comprise a plurality of wheels 32, 34 located on the bucket 150 proximate the base 22. The bucket 150 may further comprise at least one of a handle 38 and a grip 37 formed by a portion of the exterior surface 14 or by a conventional bucket handle such that a user can lift or drag or roll the bucket to facilitate transport thereof.

The bucket 150 may comprise a heat shield 160 connected to and partially covering and exterior surface 14. "Partially covering" preferably means that the heat shield 160 covers at least twenty-five percent (25%) of the device body 162 of the bucket 150. More preferably, "partially covering" means that the heat shield 160 covers at least fifty percent (50%) of the device body 162 of the bucket 150. More preferably still, "partially covering" means that the heat shield 160 covers at least seventy-five percent (75%) of the device body 162 of the bucket 150. Most preferably, "partially covering" means that the heat shield 160 covers one hundred percent (100%) of the device body 162 of the bucket 150.

One of ordinary skill in the art would appreciate from this disclosure that the heat shield 160 may comprise two layers of material with a vacuum contained therebetween, two layers of material with insulation contained therebetween, a second layer of material comprising polymer, rubber, silicone, or other insulating material directly on the exterior surface 14 of the device body 162, or any other sufficiently thin, insulating, efficient to manufacture, efficient to install, and lightweight material as desired without departing from the scope of the present invention.

The heat shield 160 may have the advantages of protecting a user 82 of the bucket 150 from burns and other heat related injuries when carrying the bucket 150, or absorbing heat from the waste liquid and waste oil that may splash out of the opening 154 and run down the sides toward a user's hands.

Figure 34:
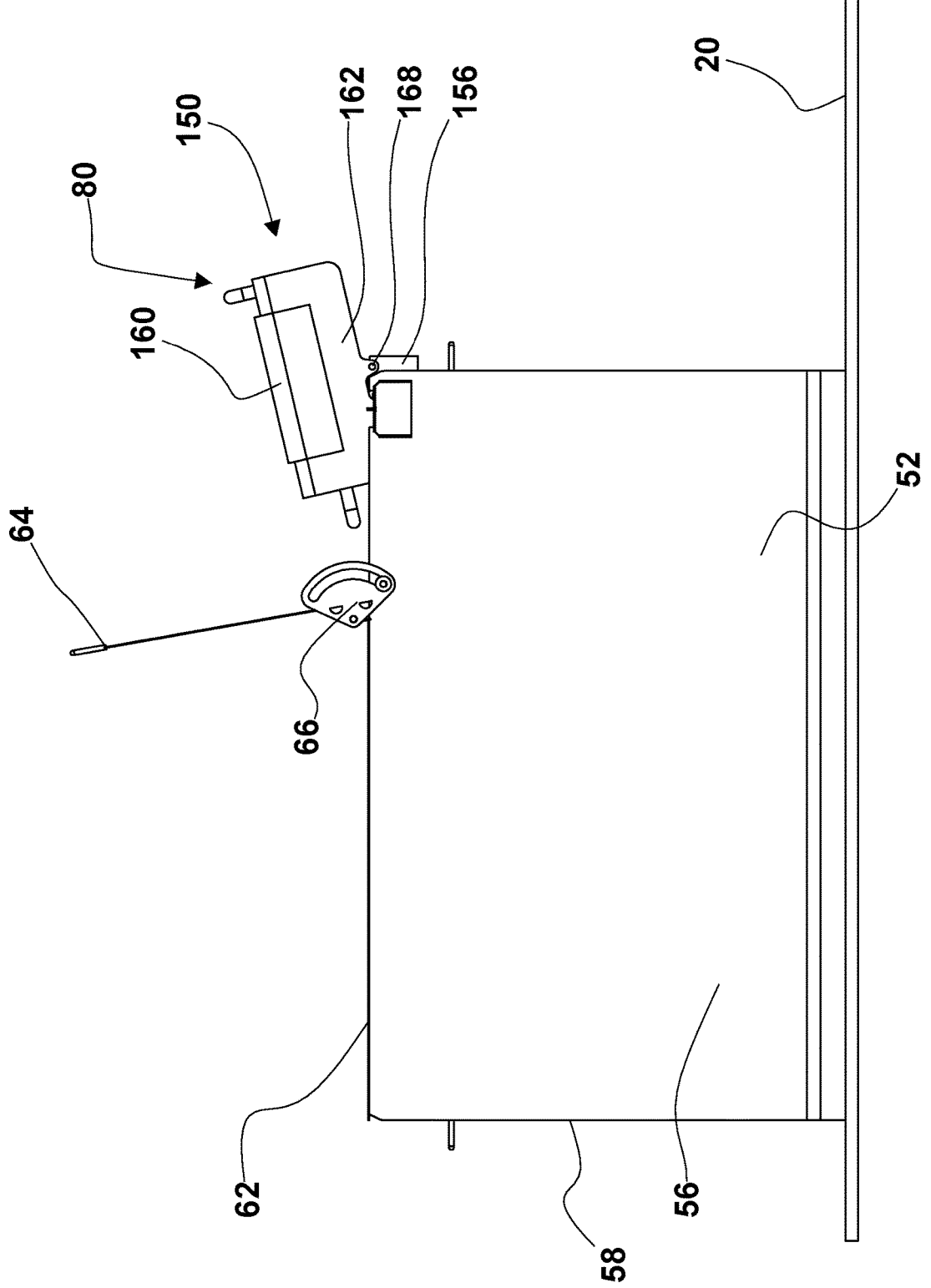
FIG. 34 is a side view of the combination liquid holding device and liquid receptacle 100 in the alternative preferred embodiment. Here, the bucket 150 is shown in a second, pour position 114. A connector mechanism 168 may also be seen. The connector mechanism 168 may comprise a receptacle connector 156 and/or a second connector 158. The connector mechanism 168 may be detachable or fixed.
Figure 35:
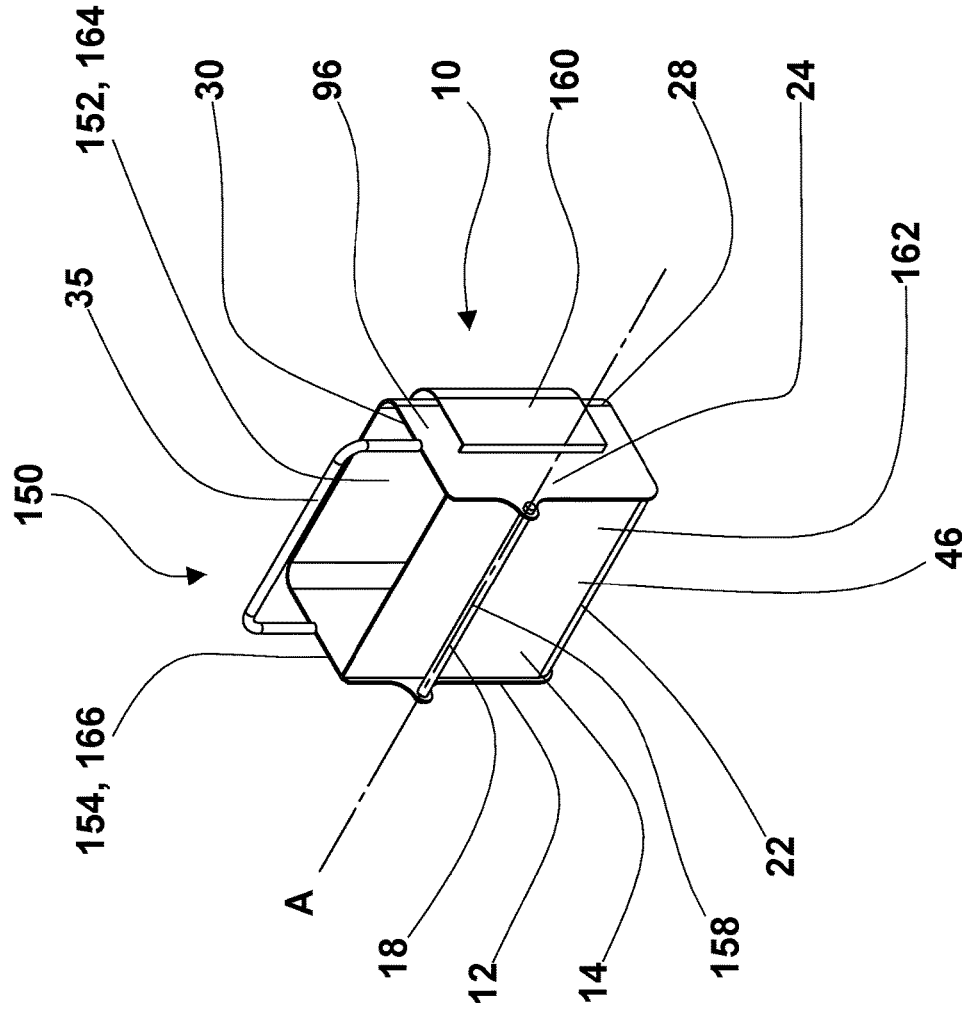
FIG. 35 is a front perspective view of a liquid holding device 10 in the alternative preferred embodiment. The liquid holding device 10 may comprise a bucket 150. The bucket 150 may define a recess or chamber 152 contained therein. The bucket 150 may also comprise a device body 162. The recess or chamber 152 may be in fluid communication with the external environment via an opening 154.

Referring now specifically to FIGS. 34 and 38, a connector mechanism 168 may be seen. The connector mechanism 168 may comprise a receptacle connector 156 and a second connector 158. The connector mechanism 168 may allow the bucket 150 to rotate around an axis of rotation A, and relative to the liquid receptacle 50, without additional movement or displacement in any other direction or along any other axis.

Further advantages of this alternative preferred embodiment may be that the risk of the user dropping the liquid holding device 10, and the liquid holding device 10 freely swinging back to the first, non-pour position 112, may be significantly reduced.

Further advantages of this device may be to allow the easy transportation and storage of waste liquid, especially waste oil, from a restaurant kitchen or other industrial cooking facility by providing a hollowed out and easy-to-roll hand truck for carrying liquid as well as a dumpster designed specifically to hold such liquid.

One of ordinary skill in the art will appreciate from this disclosure that the various components and elements of the present invention may be constructed of any suitably strong, wear-resistant, flexible (where desired), and inexpensive metals, polymers, alloys, plastics, and other materials without departing from the scope of the present invention.

One of ordinary skill in the art will appreciate from this disclosure that device elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed, described in the specification, and/or shown in the figures. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

What is claimed is:

1. A combination liquid holding device and liquid receptacle, comprising:
a liquid holding device, wherein the liquid holding device is configured for transportation in a same manner as a hand truck, comprising:
a device body having an exterior surface and a base, the device body defining a body chamber configured to hold liquid therein;
the device body defining a body opening in fluid communication with the body chamber, the device body is a tank such that the body chamber is a tank chamber configured to hold liquid therein, the body opening is a tank opening in fluid communication with the tank chamber; and the connector mechanism comprises an attachment bar secured to the tank in a spaced apart fashion from the exterior surface, the attachment bar defining an axis of rotation; and
a plurality of wheels attached to the tank, the plurality of wheels configured to facilitate transporting the tank by allowing the plurality of wheels to roll on the supporting surface while moving the tank such that the tank can be moved in a same manner as a hand truck; and
a liquid receptacle positioned on a supporting surface, comprising:
a receptacle body defining a receptacle chamber configured to hold and store liquid;
the receptacle body defining a receptacle opening;
a connector mechanism located on at least one of the liquid holding device and the liquid receptacle which is configured to form a detachable positive connection therebetween, the connector mechanism being configured to only allow pivoting about an axis of rotation between the liquid holding device and the liquid receptacle while the liquid holding device is connected to the liquid receptacle via the connector mechanism, the liquid holding device may be rotated such that liquid tends to be biased for movement from the body chamber, through the body opening, through the receptacle opening, and into the receptacle chamber;

the liquid receptacle having a receptacle bracket configured to detachably connect to the attachment bar, the liquid holding device being rotatable relative to the liquid receptacle about the axis of rotation when the receptacle bracket is connected to the attachment bar of the liquid holding device;
wherein the attachment bar is on a same side of the tank as the tank opening;
wherein the liquid holding device is positioned in a first, vertical position, the base is located on the supporting surface, the same side of the tank is angled relative to the supporting surface;
the receptacle bracket having a free end which incorporates a ramp section and having a slot located between the ramp section and the liquid receptacle;
the tank having a tapered shape such that when the liquid holding device is in the first, vertical position, a first area of the tank at the base, as measured in cross section parallel to the supporting surface, is greater than a second area of the tank at the opening, as measured in cross section parallel to the supporting surface;
the tank and the plurality of wheels being configured such that when the liquid holding device is moved into the first vertical position after being moved as the hand truck with the edge of the base adjacent to the hand truck, the attachment bar rides along the ramp portion to facilitate driving the attachment bar into position in the slot; and
wherein the liquid is waste oil.

2. The combination of claim 1, further comprising a first filtering insert configured for placement in the tank opening, the first filtering insert configured to reduce an amount of particulates and other foreign objects from entering the tank chamber with the liquid.

3. The combination of claim 2, further comprising a splash guard configured to sit in the tank opening, the splash guard preventing excess liquid from splashing out of the tank opening from the tank chamber when the liquid holding device is attached thereto and rotated.

4. The combination of claim 2, further comprising a second filtering insert configured to cover the receptacle opening, the second filtering insert reducing the amount of particulates and other foreign objects from entering the receptacle chamber with the liquid.

5. The combination of claim 1, wherein when the liquid holding device is in the first, vertical position the attachment bar and the receptacle bracket are generally equally distanced from the supporting surface, as measured perpendicular to the supporting surface, and the tank opening is positioned farther from the supporting surface than the receptacle opening, as measured perpendicular to the supporting surface.

6. The combination of claim 5, wherein the liquid holding device is in a second, horizontal position when the liquid holding device is engaged with the liquid receptacle and the liquid holding device has been rotated about the axis of rotation and the same side of the tank is substantially parallel to the supporting surface.

7. The combination of claim 5, wherein when the liquid holding device is in the second, horizontal position and engaged with the liquid receptacle, the tank opening is above and closely aligned with the receptacle opening to facilitate pouring liquid from the liquid holding device into the liquid receptacle.

* * * * *